(12) United States Patent
Kosciusko et al.

(10) Patent No.: US 8,019,750 B2
(45) Date of Patent: Sep. 13, 2011

(54) SYSTEM AND METHOD FOR AUTOMATICALLY GENERATING DATABASE QUERIES

(75) Inventors: Edward Kosciusko, North Caldwell, NJ (US); Sreekumar Menon, Parsippany, NJ (US); Hung-Vuong Vo, San Jose, CA (US); John K. Vincent, Alameda, CA (US); Thomas K. Werling, San Francisco, CA (US); Joyce H. Lau, Oakland, CA (US)

(73) Assignee: Computer Associates Think, Inc., Islandia, NY (US)

( * ) Notice: Subject to any disclaimer, the term of this patent is extended or adjusted under 35 U.S.C. 154(b) by 1112 days.

(21) Appl. No.: 11/327,945

(22) Filed: Jan. 9, 2006
 (Under 37 CFR 1.47)

(65) Prior Publication Data

US 2007/0038618 A1 Feb. 15, 2007

Related U.S. Application Data

(63) Continuation of application No. 11/129,867, filed on May 16, 2005, now abandoned, which is a continuation of application No. 10/913,998, filed on Aug. 6, 2004, now abandoned, which is a continuation of application No. 10/626,426, filed on Jul. 24, 2003, now abandoned, which is a continuation of application No. 10/288,659, filed on Nov. 5, 2002, now abandoned, which is a continuation of application No. 10/087,890, filed on Feb. 28, 2002, now abandoned, which is a continuation of application No. 09/865,276, filed on May 25, 2001, now abandoned.

(60) Provisional application No. 60/207,379, filed on May 26, 2000.

(51) Int. Cl.
 G06F 7/00 (2006.01)
 G06F 17/30 (2006.01)
(52) U.S. Cl. ...................................................... 707/718
(58) Field of Classification Search .................. 707/718
 See application file for complete search history.

(56) References Cited

U.S. PATENT DOCUMENTS

| | | | |
|---|---|---|---|
| 5,276,870 | A | 1/1994 | Shan et al. |
| 5,347,653 | A | 9/1994 | Flynn et al. |
| 5,404,510 | A | 4/1995 | Smith et al. |
| 5,421,008 | A * | 5/1995 | Banning et al. .................... 707/4 |
| 5,555,409 | A | 9/1996 | Leenstra, Sr. et al. |
| 5,560,007 | A | 9/1996 | Thai |
| 5,666,528 | A * | 9/1997 | Thai .............................. 707/102 |
| 5,675,785 | A | 10/1997 | Hall et al. |
| 5,745,904 | A | 4/1998 | King et al. |

(Continued)

OTHER PUBLICATIONS

E Aronoff, K Loney, N Sonawalla, Explain Plan: Everything You Wanted to Know and Had No-One to Ask, http://www2.lifl.fr/~bossut/Docu/explain.pdf, 1995, pp. 8 and 9.*

(Continued)

Primary Examiner — John R. Cottingham
Assistant Examiner — Nicholas E Allen
(74) Attorney, Agent, or Firm — Baker Botts L.L.P.

(57) ABSTRACT

A method of tuning a database query includes selecting a database query, parsing the selected database query to determine relationships between portions of the selected database query, selecting an optimization mode from a plurality of available optimization modes, tuning the selected database query by modifying, at least one portion of the selected database query based on the determined relationships and the selected optimization mode and displaying the modified database query.

38 Claims, 13 Drawing Sheets

U.S. PATENT DOCUMENTS

| | | | |
|---|---|---|---|
| 5,758,145 | A | 5/1998 | Bhargava et al. |
| 5,761,654 | A * | 6/1998 | Tow .................................. 707/2 |
| 5,765,147 | A | 6/1998 | Mattos et al. |
| 5,765,168 | A | 6/1998 | Burrows |
| 5,806,062 | A * | 9/1998 | Chen et al. ........................ 707/4 |
| 5,956,707 | A * | 9/1999 | Chu .............................. 707/759 |
| 6,061,676 | A * | 5/2000 | Srivastava et al. ................. 707/3 |
| 6,205,441 | B1 * | 3/2001 | Al-omari et al. ................... 707/2 |
| 6,259,896 | B1 * | 7/2001 | Sepponen .................. 455/575.5 |
| 6,363,377 | B1 * | 3/2002 | Kravets et al. ..................... 707/4 |
| 6,434,545 | B1 * | 8/2002 | MacLeod et al. ................. 707/3 |
| 2002/0052893 | A1 * | 5/2002 | Grobler et al. ............... 707/509 |
| 2005/0120000 | A1 * | 6/2005 | Ziauddin et al. .................. 707/3 |

OTHER PUBLICATIONS

Goel et al., "*SQL Query Optimization: Reordering for a General Class of Queries*," Proceedings of the 1996 ACM SIGMOD International Conference on Management of Data, Montreal, Quebec, Canada, Jun. 4-6, 1996, SIGMOD Record vol. 25, No. 2, Jun. 1996, pp. 47-56.

Simmen, et al., "*Fundamental Technique for Order Optimization*," Proceedings of the 1996 ACM SIGMOD International Conference on Management of Data, Montreal, Quebec, Canada, Jun. 4-6, 1996, SIGMOD Record 25, No. 2, Jun. 1996, pp. 57-67.

Christophides, et al., "*Evaluating Queries with Generalized Path Expressions*," Proceedings of the 1996 ACM SIGMOD International Conference on Management of Data, Montreal, Quebec, Canada, Jun. 4-6, 1996, SIGMOD Record 25, No. 2, Jun. 1996, pp. 413-422.

Rao et al., "*Reusing Invariants: A New Strategy for Correlated Queries*," Proceedings of ACM SIGMOD International Conference on Management of Data, Seattle, Washington, USA, SIGMOD Record vol. 27, Issue 2, Jun. 1998, pp. 37-48.

Bhargava et al., "*Hypergraph Based Reorderings of Outer Join Queries with Complex Predicates*," Proceedings of the 1995 ACM SIGMOD International Conference on Management of Data, San Jose, California, USA, SIGMOD Record vol. 24, Issue 2, Jun. 1995, pp. 304-315.

Shin et al., "*A New Join Algorith*," SIGMOD Record vol. 23, No. 4, Dec. 1994, pp. 13-18.

Hellerstein et al., "*Predicate Migration: Optimizing Queries with Expensive Predicates*," Proceedings of the ACM SIGMOD International Conference on Management of Data, Washington, DC, USA, SIGMOD Record vol. 22, Issue 2, Jun. 1993, pp. 267-276.

Hellerstein et al., "*Query Execution Techniques for Caching Expensive Methods*".

O'Neil et al., "*Multi-Table Joins Through Bitmapped Join Indices*".

Chen et al., "*On Applying Hash Filters to Improving the Execution of Multi-join Queries*".

Notification of Transmittal of the International Search Report or the Declarationl ; International Application No. PCT/US 01/17171; Applicant's or Agent's File Reference: 0655/62169-PCT;6 pages, Mailed Feb. 27, 2003.

Oracle: "Oracle Enterprise Manager Concepts Guide 2.1"; retrieved from the Internet: URL:http://download-east.oracle.com/docs/pdf/A75684_01.pdf; Nov. 18, 1999; XP-002229596, Retrieved on Jan. 28, 2003.

Don Burleson: "Platinum Plan Analyzer", DBMS; retrieved from the Internet: URL:http://web.archive.org/web/20000229044247/http://dbmsmag.com/9603d08.html; Mar. 1996; XP-002229597, Retrieved on Jan. 28, 2003.

Oracle: "Oracle8i Designing and Tuning for Performance"; retrieved from the Internet: URL:http://otn.oracle.com/doc.oracle81_816/server.816/a76992.pdf; Dec. 1999; XP-002229598, Retrieved on Jan. 28, 2003.

* cited by examiner

FIG. 7

SYSTEM AND METHOD FOR AUTOMATICALLY GENERATING DATABASE QUERIES

CROSS REFERENCE TO RELATED APPLICATIONS

This application is a continuation of U.S. application Ser. No. 11/129,867, filed May 16, 2005 now abandoned, which is a continuation of U.S. application Ser. No. 10/913,998 filed Aug. 6, 2004 now abandoned, which is a continuation of U.S. application Ser. No. 10/626,426 filed Jul. 24, 2003 now abandoned, which is a continuation of U.S. application Ser. No. 10/288,659 filed Nov. 5, 2002, now abandoned, which is a continuation of U.S. application Ser. No. 10/087,890 filed Feb. 28, 2002, now abandoned, which is a continuation of U.S. application Ser. No. 09/865,276 filed May 25, 2001, now abandoned, which claims benefit of U.S. Application Ser. No. 60/207,379 filed May 26, 2000, each of which is incorporated herein by reference.

FIELD

The present specification relates to databases and, more specifically, to a system and method for automatically generating database queries.

BACKGROUND

Structured Query Language (SQL) is the ANSI standard language for interacting with databases. SQL allows users to combine information from many different sets of records (tables) in a database in order to retrieve data from the database. However, the power of SQL has some drawbacks. For example, a user can combine different tables in an SQL query, which may create queries that can be impossible for the database engine to resolve or that may utilize a significant amount of system resources.

Database systems often include performance tuning systems or methods. For example, Oracle 7 provides various scripts (e.g., UTILBSTAT and UTLESTAT) that can be used to assist in performance tuning by summarizing the operating state of a database in one or more reports. These scripts are a set of SQL scripts useful for capturing a snapshot of system-wide database performance statistics and generating a report which can help an operator optimize the performance of the database. The database operator can use the reports for fine-tuning the database performance and for preventative maintenance of the database. A report may include, for example, information about database memory objects, including library cache, dictionary cache, latch usage, file I/O and roll-back statistics.

A problem with existing systems is that they often limit the amount of time it takes to produce an optimal execution plan. In addition, a knowledgeable user might have more insight into the data than represented by the object statistics, if object statistics are present at all. Existing systems often do not take advantage of the knowledge of the user. In addition, although statistics may be useful when properly provided and analyzed, statistics might not exist at all if the objects have not yet been analyzed, or the statistics may be out-of-date. A specific statistic that would provide insight to the distribution of the data may not be present in a particular instance. On the other hand, the user may have first hand knowledge that may be useful in tuning database queries that my not otherwise be available. For example, the user may know that the query will be executed at a time when more resources, such as multiple CPUs, will be available, even though the system is normally fully utilized. Such information could prove very helpful during a database query tuning process.

SUMMARY

A method of tuning a database query comprises selecting a database query, parsing the selected database query to determine relationships between portions of the selected database query, selecting an optimization mode from a plurality of available optimization modes, tuning the selected database query by modifying at least one portion of the selected database query based on the determined relationships and the selected optimization mode and displaying the modified database query.

The parsing may determine tokens within the database query, tokens being words separated by delimiters. The plurality of available optimization modes may include Cost based and Rule based modes. The Cost based modes may include First_Rows mode and All_Rows mode. The method may further comprise determinidng a cost associated with using the tuned database query. The method may further comprise comparing a cost associated with using the selected database query to the cost associated with using the tuned database query. The method may further comprise parsing the selected database query to determine whether the database query includes at least one subquery joined by at least one of a NOT EXISTS, a NOT IN and an ALL clause, further comprise prompting a user to select preferences to be used during tuning based on whether the database query includes at least one of a NOT EXISTS, a NOT IN and an ALL clause.

The preferences may include rewrite preferences for enabling a user to select at least one of a conversion of NOT EXISTS operators to a NOT IN operator and conversion of the selected database query to an outer join. The preferences may include rewrite preferences for enabling a user to select to convert subqueries joined by an ALL operator to a join or outer-join. The preferences may include rewrite preferences for enabling a user to select whether to use at least one of a NOT EXISTS operator and an outer-join to convert subqueries joined by a NOT In operator.

A computer storage medium includes computer executable code for tuning a database query, comprising computer executable code for allowing a user to select a database query, computer executable code for parsing the selected database query to determine relationships between portions of the selected database query, computer executable code for allowing a user to select an optimization mode from a plurality of available optimization modes, computer executable code for tuning the selected database query by modifying at least one portion of the selected database query based on the determined relationships and the selected optimization mode and computer executable code for displaying the modified database query.

A programmed computer system for tuning a database query comprises a display for displaying at least one database queries to a user, a user input allowing the user to select a database query from among the displayed database queries and an optimization mode from a plurality of available optimization modes and a processor for parsing the selected database query to determine relationships between portions of the selected database query, and for tuning the selected database query by modifying at least one portion of the selected based on the determined relationships and the seleted optimization mode, the modified database query being displayed to the user via the display.

BRIEF DESCRIPTION OF THE DRAWINGS

The following drawings depict illustrative examples only and are provided for an even more complete appreciation and understanding of the following description.

FIG. 7 shows an edit or tuning window display;

DETAILED DESCRIPTION

Figure 1:
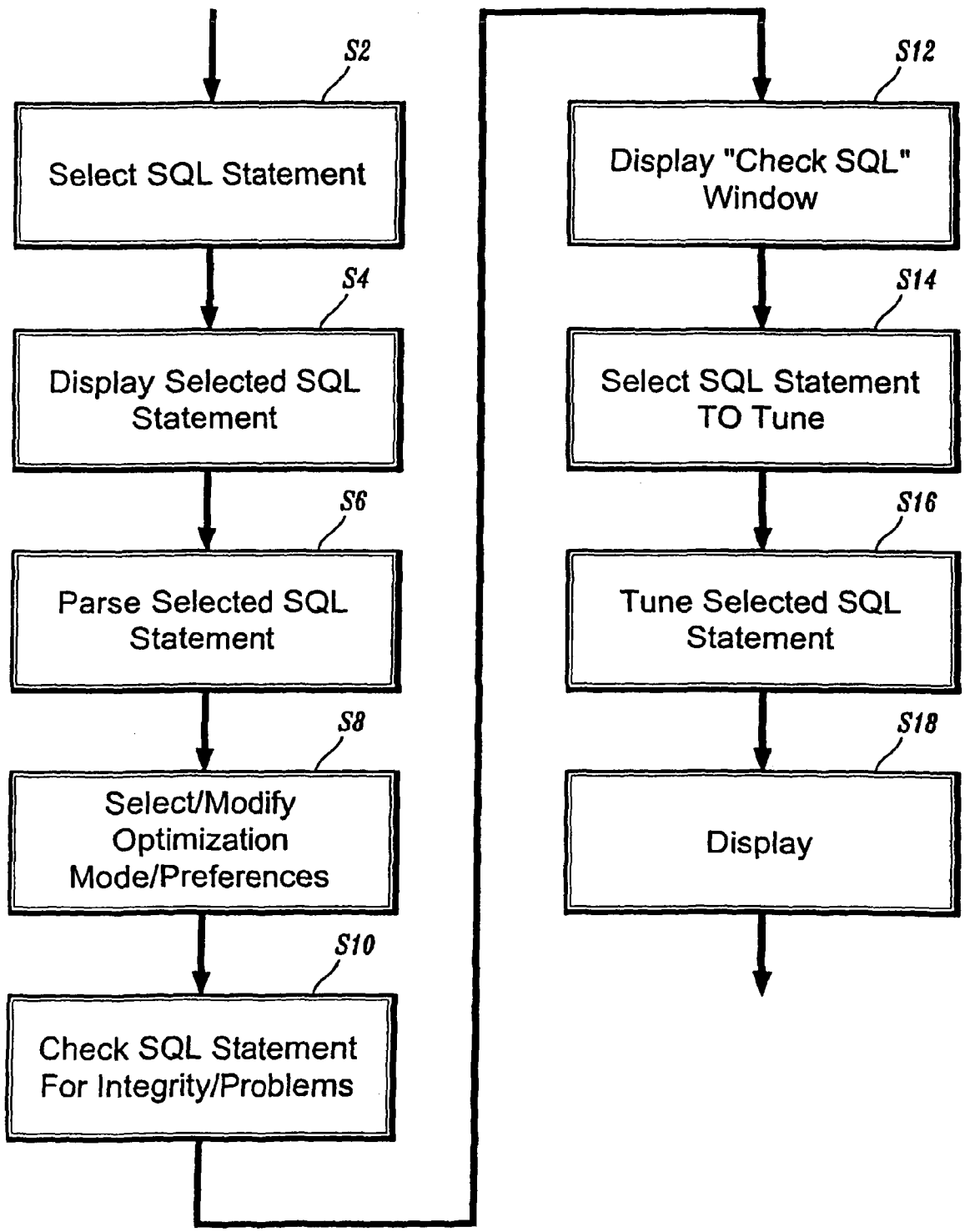
FIG. 1 is a block diagram for describing a database query tuning process according to an embodiment.
Figure 2:
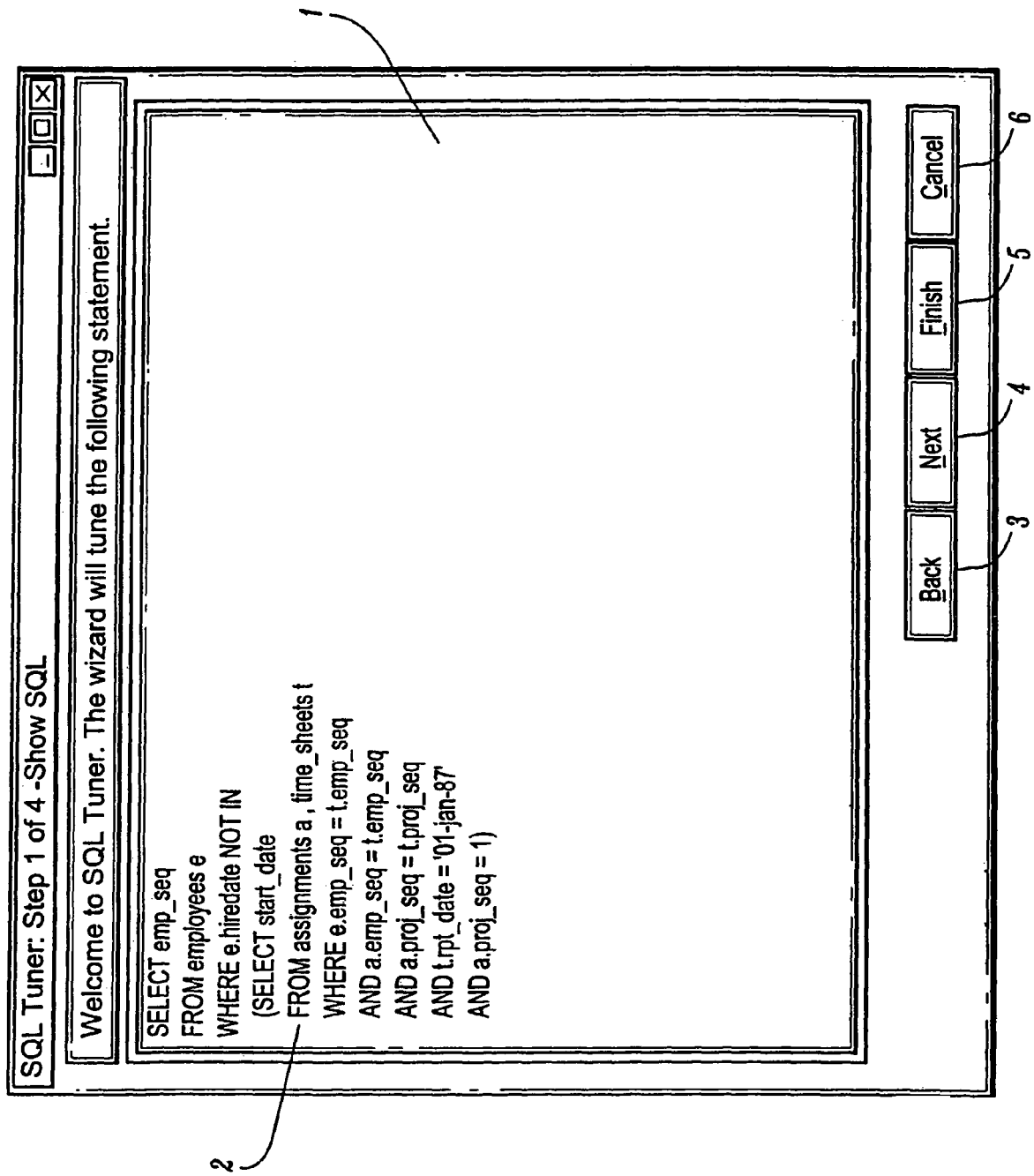
FIG. 2 shows a dialog display including an SQL statement.

In describing preferred embodiments of the present disclosure illustrated in the drawings, specific terminology is employed for sake of clarity. However, the present disclosure is not intended to be limited to the specific terminology so selected and it is to be understood that each specific element includes all technical equivalents which operate in a similar manner.

The present disclosure relates to a system and method that automatically tunes database queries for increasing performance. For example, the present system and method may be in the form of a database management system (DBMS) capable of tuning Structured Query Language (SQL) statements to produce an optimal execution plan. In one aspect, the present disclosure relates to systems and methods for analyzing a database query in the context of the database structure and modifying and/or restructuring the query so that it can be executed within the context of the DBMS structure. In addition, the system and method of the present disclosure can utilize the database relationship structure to minimize the DBMS resources used by the query and to ensure that the query is completed.

One way to achieve these results is to parse the SQL statement into a custom data structure that permits the modification and/or restructuring of the SQL statement. As an example, each table in, e.g., a FROM clause, may be checked for referential integrity and compared against, e.g., a users WHERE condition, and the WHERE condition may be checked for correct outer join specifications.

The present system parses out the SQL statement and keeps track of each token, how tables are joined, and the relationships between portions of the SQL statement. A token may be any word within an SQL statement separated by delimiters. Tokens that stand for table column names may be used to identify joins and other relationships existing within the SQL statement. The system and method may then change, for example, the join order and may move subqueries to tune the SQL statement for top performance. The system and method may be implemented in the form of a software application running on a computer system such as a mainframe, personal computer (PC), handheld computer, etc. The computer system may be linked to a database. The link may be, for example, via a direct link such as a direct hard wire or wireless connection, via a network connection such as a local area network, or via the Internet.

Figure 9:
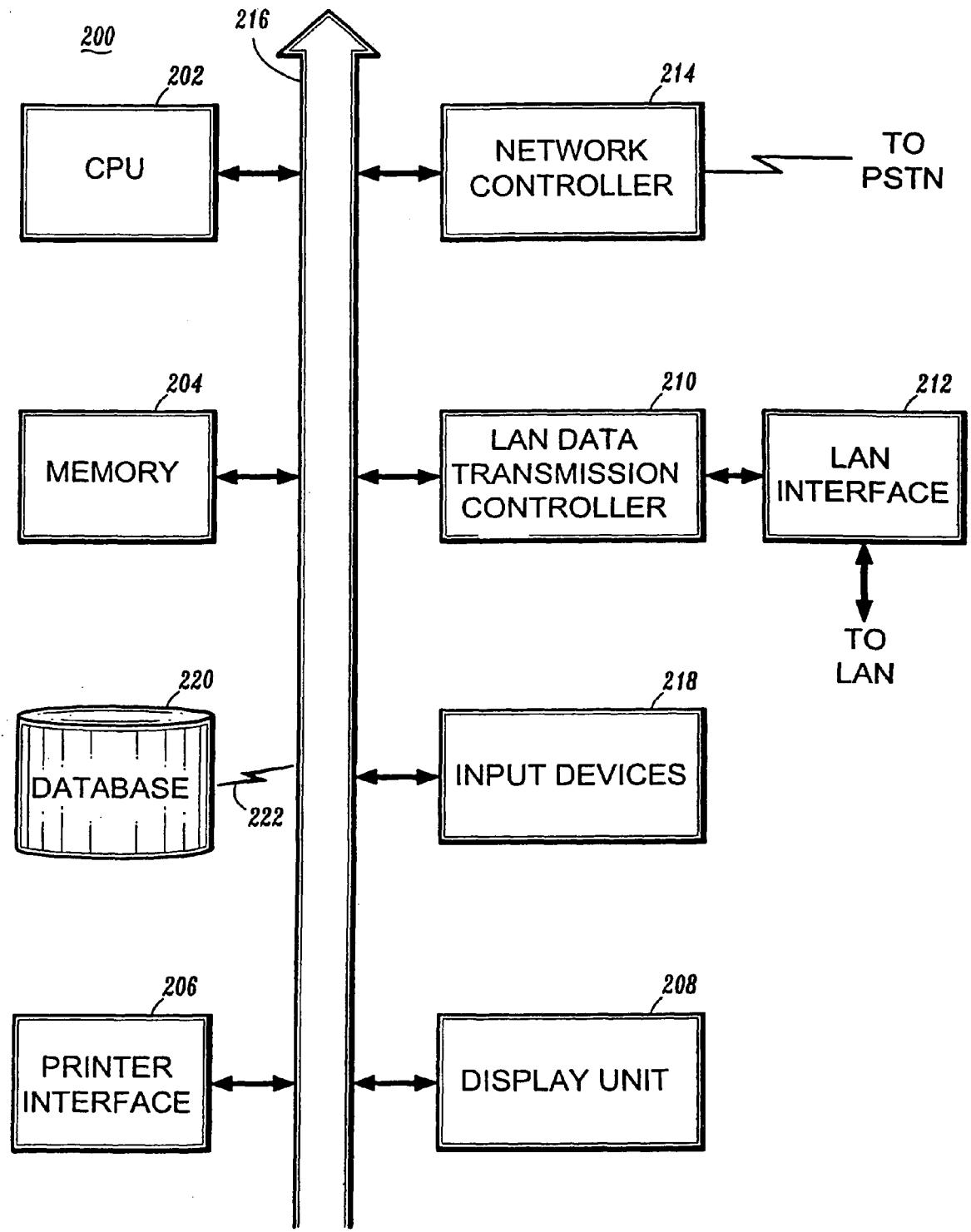
FIG. 9 is a block diagram of a computer system to which the present system and method may be applied.

An example of a computer system capable of implementing the present system and method is shown in FIG. 9. The computer system referred to generally as system 200 may include a central processing unit (CPU) 202, memory 204, a printer interface 206, a display unit 208, a LAN (local area network) data transmission controller 210, a LAN interface 212, a network controller 214, an internal bus 216 and one or more input devices 218 such as, for example, a keyboard, mouse, etc. As shown, the system 200 may be connected to a database 220 via a link 222.

FIG. 1 depicts a process according to an embodiment of the present disclosure for tuning SQL statements for increased performance. A user first selects an SQL statement they desire to have tuned (Step S2). For example, from an SQL edit window displayed on display unit 208, a user can highlight an SQL statement they desire to have tuned by placing the cursor at the beginning of the SQL statement, left-clicking the mouse and scrolling down to the end of the SQL statement and then releasing the mouse button. This will highlight the SQL statement. The user can then select an SQL Tuner option from a Tools menu (not shown) by, for example, clicking on an appropriate button.

The highlighted SQL statement to be tuned is then displayed SQL statement 2 to confirm that it is the SQL statement that they desire to tune. The user then has the option of clicking Back button 3. Next button 4. Finish button 5 or Cancel button 6. Back button 3 returns to the previous window, allowing the user to select a different SQL statement. Cancel button 6 exits the SQL tuner window 1 without any changes being made to the displayed SQL statement 2. Next button 4 moves to the next window (shown in FIG. 3), allowing the user to select optimization mode settings as will be described later below. Finish button 5 runs the SQL tuning process using the current optimization mode settings.

Figure 3:
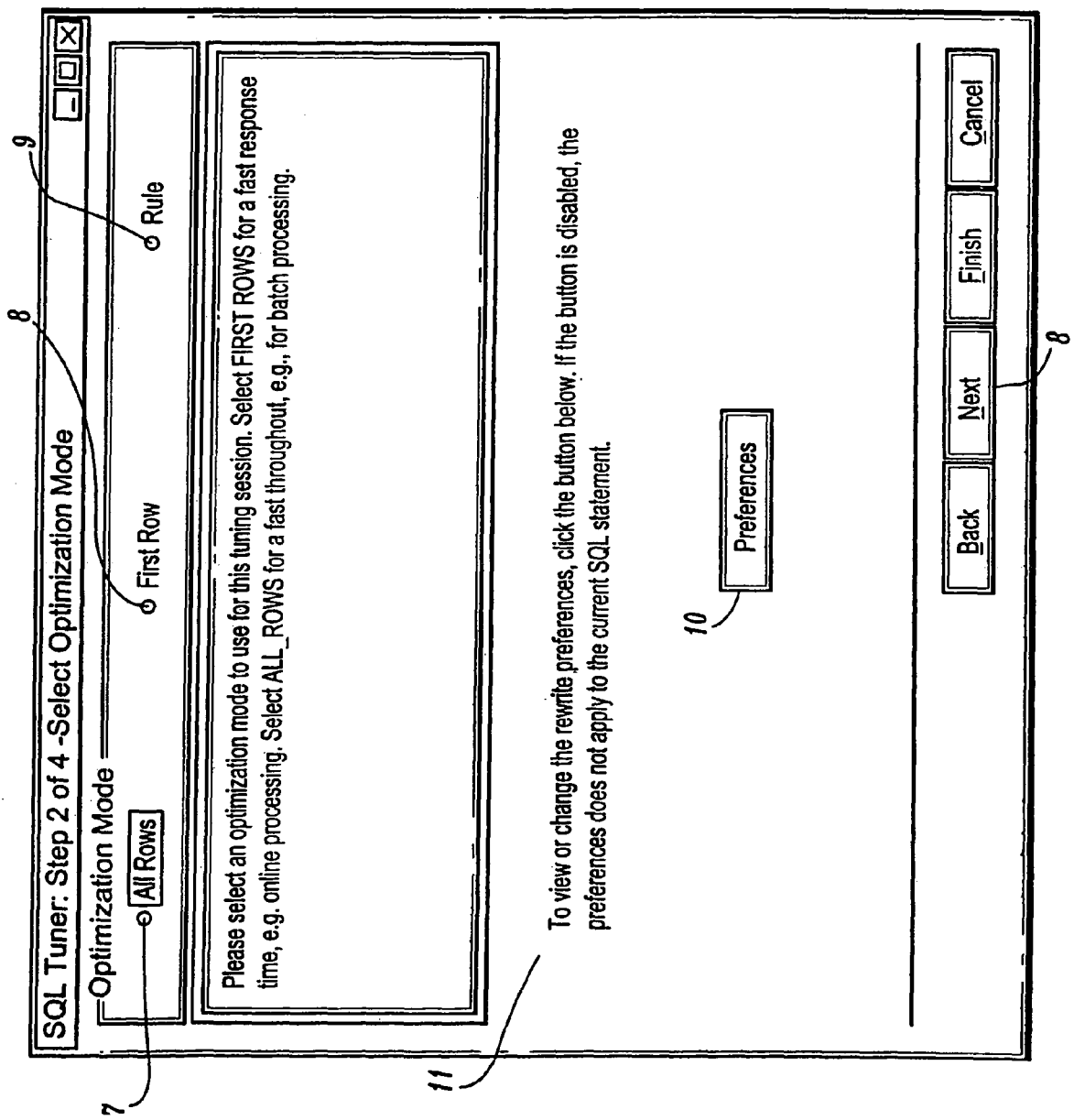
FIG. 3 shows a Select Optimization Mode dialog display.

The present system is capable of operating utilizing several optimization modes, and using several different rewrite preferences. After Next button 4 is clicked on by the user, the present system parses the SQL statement (Step S6) and displays a Select Optimization Mode window 11 as shown in FIG. 3. The SQL statement is checked to determine, for example, what operators, functions, etc. exist in the statement. The system also checks to determine whether any subqueries within the SQL statement are joined by NOT EXISTS, NOT IN, or ALL clauses. The present system also checks table statistics. For example, table statistics generated by a system such as Oracle when executing an ANALYZE command on a table may be checked. The table statistics may include number of rows (NUM_ROWS), number of data blocks below the high water mark (e.g., the number of data blocks that have been formatted to receive data, regardless of whether they currently contain data or are empty) (BLOCKS), the average available free space in each data block in bytes (AVG_SPACE), the number of chained rows (CHAIN_COUNT) and the average row length, including the row's overhead, in bytes (AVG_ROW_LEN).

If sufficient information exists (e.g., statistics exist for the relevant tables), the system automatically selects an optimization mode. The selected optimization mode is indicated by radio buttons 7-9. For example, a cost-based optimization (FIRST ROW or ALL ROWS) mode may be automatically selected since it will yield good results if statistics exist on the tables concerned. In Step S8, if there is insufficient information in the table statistics for the system to automatically select an optimization mode or if the user desires to change an optimization mode setting made automatically by the system, the user can manually select the optimization mode by clicking one of the radio buttons 7-9 in the Select Optimization Mode window 11 as shown in FIG. 3, the user can also modify rewrite preferences settings from window 11, as will be described in more detail below by clicking Preferences button 10.

One cost-based optimization mode is referred to as ALL_RPWS mode. The ALL_ROWS mode is automatically selected by default by the system if statistics exist on at least one of the referenced tables in the SQL statement. ALL_ROWS mode provides fast throughput for batch processing. The user then has the option of selecting a FIRST_ROWS mode by clicking radio button 8, unless the SQL statement contains a set operator (e.g., UNION, INTERSECT, MINUS, UNION ALL), A GROUP BY clause, a FOR UPDATE clause, aggregate functions, or a DISTINCT operator. If the SQL statement contains a set operator (e.g. . . . UNION, INTERSECT, MINUS, UNION ALL), a GROUP BY clause, a FOR UPDATE clause, aggregate functions, or a DISTINCT operator, the user is not given the option to select the FIRST ROWS mode. The ALL_ROWS mode can also be manually selected by the user by clicking radio button 7.

The FIRST_ROWS mode may be automatically selected by the system when the system cannot otherwise determine an optimization mode to use for the session. The FIRST_ROW mode may be manually selected if a fast response time for line processing is desired.

Another mode is referred to as Rule-based mode. The Rule-based mode is automatically selected by the system if no statistics exist on any of the referenced tables. Rule-based mode may be manually selected by clicking radio button 9.

If it was determined during the parsing process (Step S6) that the SQL statement included subqueries joined by NOT EXISTS, NOT IN or ALL clauses. Preferences button 10 is made active in window 11 (FIG. 3). Clicking on Preferences button 10 allows the user to specify rewrite preferences to be used to rewrite subqueries joined by the NOT IN operator. NOT EXISTS operator and ALL operator.

For example, rewrite preferences for NOT EXISTS operators can be specified enabling the user to select conversion of the NOT EXISTS operators to a NOT IN operator and/or conversion of the statement to an outer join. Rewrite preferences for the ALL operator can be specified, allowing the user to select conversion of the statement to a join or an outer-join. Rewrite preferences for the NOT IN operator can be specified enabling the user to select conversion of the NOT IN operator to NOT EXISTS or conversion of the statement to an outer-join.

Preferences can be further defined by the user for the rewrite by choosing options that limit the conversion to instances where the surrounding interface columns are defined as NOT NULL. The user can also specify that the present system always convert and add IS NOT NULL criterion to the statement if necessary.

Figure 4:
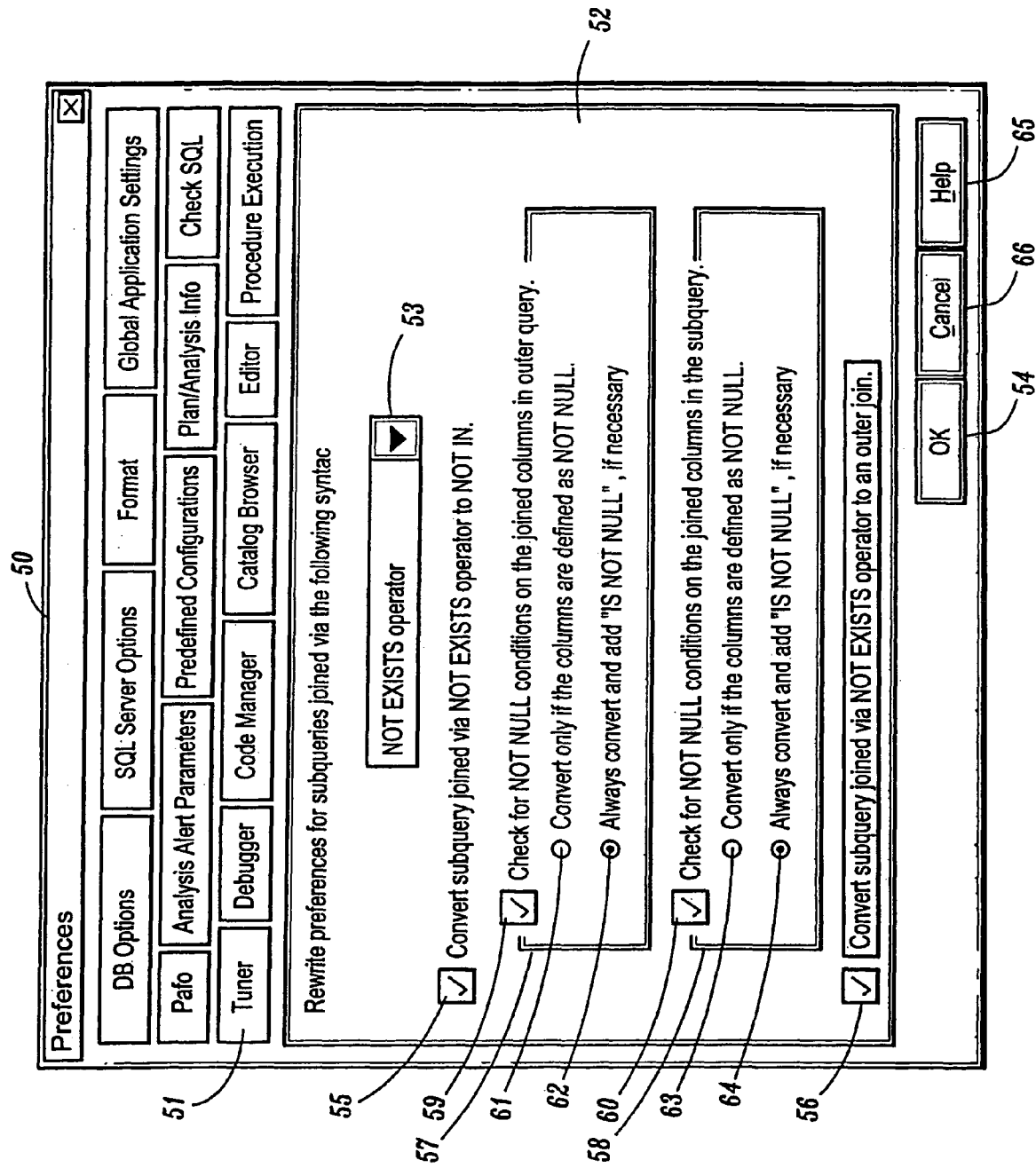
FIG. 4 shows a Preferences window display.

When Preferences button 10 is clicked by the user, a preferences window 50 as shown in FIG. 4 is displayed. An SQL Tuner preferences page 52 can then be displayed by clicking on Tuner tab 51. The options in this window enable the user to set the rewrite preferences as described above for subqueries joined by the operators ALL, NOT IN and NOT EXISTS.

In the example shown in FIG. 4, to set rewrite preferences for the NOT EXISTS operator, the user selects the NOT EXISTS operator from the pulldown menu 53. This displays a list of options available for the NOT EXISTS operator. For example, the user can then specify whether to enable the present system to use NOT IN and/or outer/join to convert subqueries joined by the NOT EXISTS operator by selecting or de-selecting the appropriate check boxes for options. "Convert Subquery Joined Via NOT EXISTS Operator To NOT IN" (check box 55) and "Convert Subquery Joined Via NOT EXISTS Operator To An Outer-Join" (check box 56).

If the "Convert Subquery Joined Via NOT EXISTS Operator To NOT IN" (check box 55) option is selected, option boxes 57 and 58 become active. Option box 57 allows the user to select the "Check For NOT NULL conditions On The Joined Columns In Outer Query" option and option box 58 allows the user to select the "Check For NOT NULL Conditions On The Joined Columns In The Subquery" option. The user may select one or both of the these options by selecting or deselecting check boxes 59 and 60, respectively. Conversion options then become active for each selected option box. For example, "Convert Only If The Columns Are Defined As NOT NULL" can be selected for the outer query and subquery by clicking radio buttons 61 and 63, respectively and "Always Convert And Add "IS NOT NULL" If Necessary" can be selected by clicking radio buttons 62 and 64, respectively. The user can then click on the "OK" button 54 to save the specified preferences and exit the preferences window. Selecting Cancel button 66 exits the window 52 without saving any changes made to the preferences. Selecting Help button 65 displays a help menu to the user.

In a similar manner, to set rewrite preferences for the ALL operator, the user selects "ALL operator" from the pulldown menu 53 to display a list of options. The user will then be presented with options to specify whether to enable the present system to convert subqueries joined by the ALL operator to a join or outer-join by selecting or de-selecting a "Convert subqueries joined via the ALL operator to a join or outer-join" option.

If the user selects this option, the user will then be presented with options to "Check For NOT NULL Conditions On The Joined Columns In The Outer Query" and "Check For NOT NULL Conditions On The Joined Columns In The Subquery". The user can then select one or both of the these options. For each of these options selected, the user is then presented with two conversion options "Convert Only If The Columns Are Defined As NOT NULL" and "Always Convert And Add "IS NOT NULL" If Necessary".

The user can then click on the "OK" button to save the specified preferences and exit the Preferences window.

To set rewrite preferences for the NOT IN operator, the user selects the NOT IN operator from the pulldown menu 53 to display a list of options. The user can then specify whether to enable the present system to use the NOT EXISTS operator and/or outer-join to convert subqueries joined by the NOT IN operator by selecting or de-selecting the options "Convert Subquery Joined Via NOT In Operator To NOT EXISTS" and "Convert Subquery Joined Via NOT IN Operator To An Outer-Join".

For each options selected, the user is then presented with an option to check for NOT NULL conditions on the joined columns in outer query and to check for NOT NULL conditions on the joined columns in the subquery. The user can select one or both of these options. Conversion options then become active for each selected option. That is, the user is given the option only if the columns are defined as NOT NULL or to always convert and add "IS NOT NULL" if necessary. The user can thus select a conversion option for joined columns on the outer query and/or the subquery. The user clicks on the "OK" button 54 to save the specified preferences and exit the Preferences window. Upon exiting the Preferences window, the display returns to the Select Optimization Mode Window 11 (FIG. 3). After Step S8 is complete and the user is satisfied with the optimization mode and preferences selections, the process can be continued by clicking Next button 8.

In Step S10 the present system checks the SQL statement for referential integrity, outer join, and/or NULL logic problems. If errors or inefficiencies are found, specific suggestions for altering the SQL statement to correct the problems are displayed. For example, suggestions may be displayed for invalid Outer Joins, which can cause invalid result sets. Suggestions may also be displayed for NULL logic problems causing invalid result sets, incorrect use of the HAVING clause, Cartesian products, expressions in join criteria for better index utilization, expressions in non-join criteria for better index utilization, and unindexed foreign keys, etc.

Figure 5:
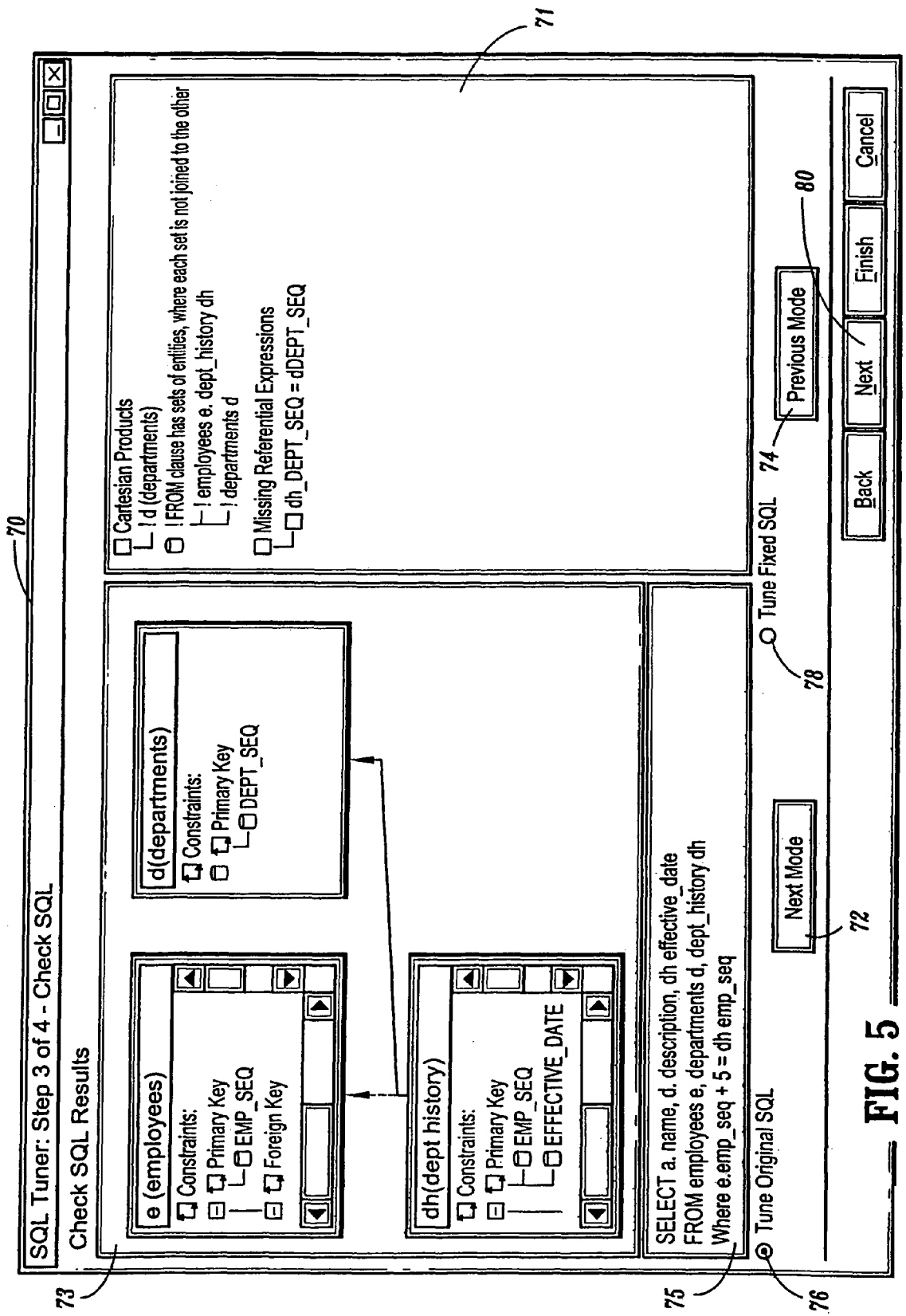
FIG. 5 shows a Check SQL dialog display.

In Step S12, a Check SQL window 70 as shown in FIG. 5 is then displayed to the user. Window portions 73 displays a diagram of each subquery in the statement. Each table in the SQL statement displays as a box with a header containing the table name and alias. The primary key, foreign keys, and unique keys are also displayed for each table.

A green lime between tables represents a correct join. If a red line connects the tables, the join contains an error (such as a referential integrity breach or in improper outer join). If a blue line connects the tables, the join is inefficient due to lack of referential integrity.

Suggested corrections to the SQL statement are displayed in window portion 71. Check SQL window 70 can be re-sized by the user as desired to view all of the information contained in any of the window portions.

Clicking on "Next SQL Module" button 72 and the "Previous SQL Module" button 74 highlights individual subqueries in the SQL statement in blue and displays only the highlighted subquery's associated diagram.

The user can then decide (Step S14) which SQL statement to tune, the original statement or the fixed statement. For example, clicking on "Tune Original SQL" button 76 tunes the original SQL statement which is displayed in the field 75 at the bottom of the Check SQL window 71 and then tunes the corrected SQL statement.

In Step S16, the selected SQL statement is tuned by performing one or more steps to optimize the statement. For example, the system may make transitive changes in the join criteria, may determine all subquery transformations, may determine transitivities in the non-join criteria if necessary and may determine join orders. The system may generate several transformed SQL statements. The system may then determine which of the transformed SQL statements has the best performance and sort the resulting SQL statements accordingly.

When tuning or transforming a SQL statement, the present system may check to see if columns of a surrounding query belong to the same table and make transitive changes, if necessary. If they do not belong to the same table, the system checks to see if any of the join criteria reference a column interfacing the subquery and identifies the equivalent column. The present system does this for each column interfacing the subquery and then uses the transitive property to generate permutations of the equivalent columns in an attempt to find a set where all of the columns belong to the same table. The present system may make transitive changes to non-correlated subqueries joined via the NOT IN operator and correlated subqueries interfaced with NOT IN, NOT EXISTS, or ALL operators.

The present system may also determine all the subquery transformations that can be performed on the SQL syntax by evaluating each subquery and assigning a rank to each of the transformations. A transformation may be mandatory (always or never) or optional. This information is then used to generate the various alternative SQL versions. For example, if a SQL statement contains four subqueries, the present system may rank non of the subqueries "always transform", one "never transform", and three "optional" to generate possible alternate SQL statements.

That is, the type of transformation determines whether the transformation should always be done, never be done or optionally be done. For example, some transformations may be desirable because the optimizer will use a better plan if the transformation were done. In this case, the transformation should always be done. Accordingly, the transformation would be assigned a highest rank. Some transformations may be undesirable since the optimizer will use a less efficient plan if the transformation were done. In this case, the transformation should not be done. Accordingly, the transformation would be assigned a lowest rank. Some transformations may or may not result in a better optimization plan being selected, since it may depend on other factors as well. In this case, the transformation may optionally be done. Accordingly, the transformation would be assigned a middle rank.

After performing the subquery transformations, the present system identifies equivalent columns in the non-join criteria that can be substituted for one another and makes the substitution. This makes it possible for the present system to rewrite the SQL statement to allow a database (e.g., such as ORACLE) to take advantage of concatenated key indexes.

For example, in the following SQL statement the e.emp_seq criterion on the subquery of DEPENDENTS can be interfaced to a.emp_seq or t.emp_seq.

```
SELECT * FROM employees e, assignments a, time_sheets t
WHERE e.emp_seq = a.emp_seq
AND a.emp_seq = t.emp_seq
AND a.proj_seq = t.proj_seq
AND e.emp_seq IN (SELECT emp_seq FROM dependents
    WHERE relation = 'SPOUSE')
```

Switching e.emp_to a.emp_seq as shown below (Line 5) enables the database to use the concatenated key index on ASSIGNMENTS:

```
SELECT * FROM employees e, assignments a, time_sheets t
WHERE e.emp_seq = a.emp_seq
AND a.emp_seq = t.emp_seq
AND a.proj_seq = t.proj_seq
AND a.emp_seq IN (SELECT emp_seq FROM dependents
    WHERE relation = 'SPOUSE')
```

Various columns can replace another column when an equality join criterion exists equating the columns. However, the present system can also use transitivities for non-join criteria that is AND'ed to the join criteria. If a non-join criterion or OR'ed to the join criteria, the transitives that result should not be used.

If a multiple column operand has transitives, the present system adds the columns to the operand, and duplicates the corresponding column on the select is. All multi-column transitivities are used for each transformation except for the original statement. If the operand is equivalent to another column via an outer-joined criterion, the equivalent column cannot be used.

If a FROM clause has a nested select statement that does not have a GROUP BY syntax or aggregates and the main query has non-join criteria referencing one of the join columns between the main query and the nested select, the present system duplicates the non-join criterion in the nested select statement in all copies of the SQL statement, including the original.

The present system can use an ORDERED hint to determine join order. The ORDERED hint forces the optimizer to join tables in the order in which they appear in the FROM clause in the SQL statement. This allows SQL statements to be written that will join tables references in the FROM clause in a particular order. The system first tests the SQL statement with no ORDERED hint. The present system then creates additional permutations using the ORDERED hint with different driving tables to force a specific join order, a driving table being, for example, a parent table in a nested-loop-join operation. Each row from a driving table can be used to find matching rows in a joined table to complete the join operation.

If the default join of the transformed SQL statement has a better cost/row value than the original SQL statement, then most likely the ORDERED hint will produce a more efficient plan but a higher cost row than the initial transformation with a default join order. The present system can display the ORDERED transformation as a viable best solution.

To determine best performance from among each of the created alternative SQL statements, the present system generates a cost statistic for the original SQL and each of the SQL statements generated by the rewrite process. The cost is determined after creating the pan associated with the SQL. For example, Oracle's EXPLAIN PLAIN statement can be used to generate a plan that the optimizer uses to execute the SQL statement. The EXPLAIN PLAN statement can be run on the SQL statements to get the execution plan which will describe the steps that the optimizer plans to use to execute the SQL statements. Oracle will also provide a number (e.g., cost) for each step in the plan. The cost is a relative figure of usage to execute the step in the plan. The costs can be summed up for all of the steps in the plan to arrive at a total cast for the plan. The present system can divide the cost calculated by the database by the number of rows, to generate a cost/row value for each of the SQL statements. Cost may also be determined by the number of logical reads required by the plan. After determining the cost, the present system sorts the SQL statements in ascending order (from the lowest to the highest cost).

Figure 6:
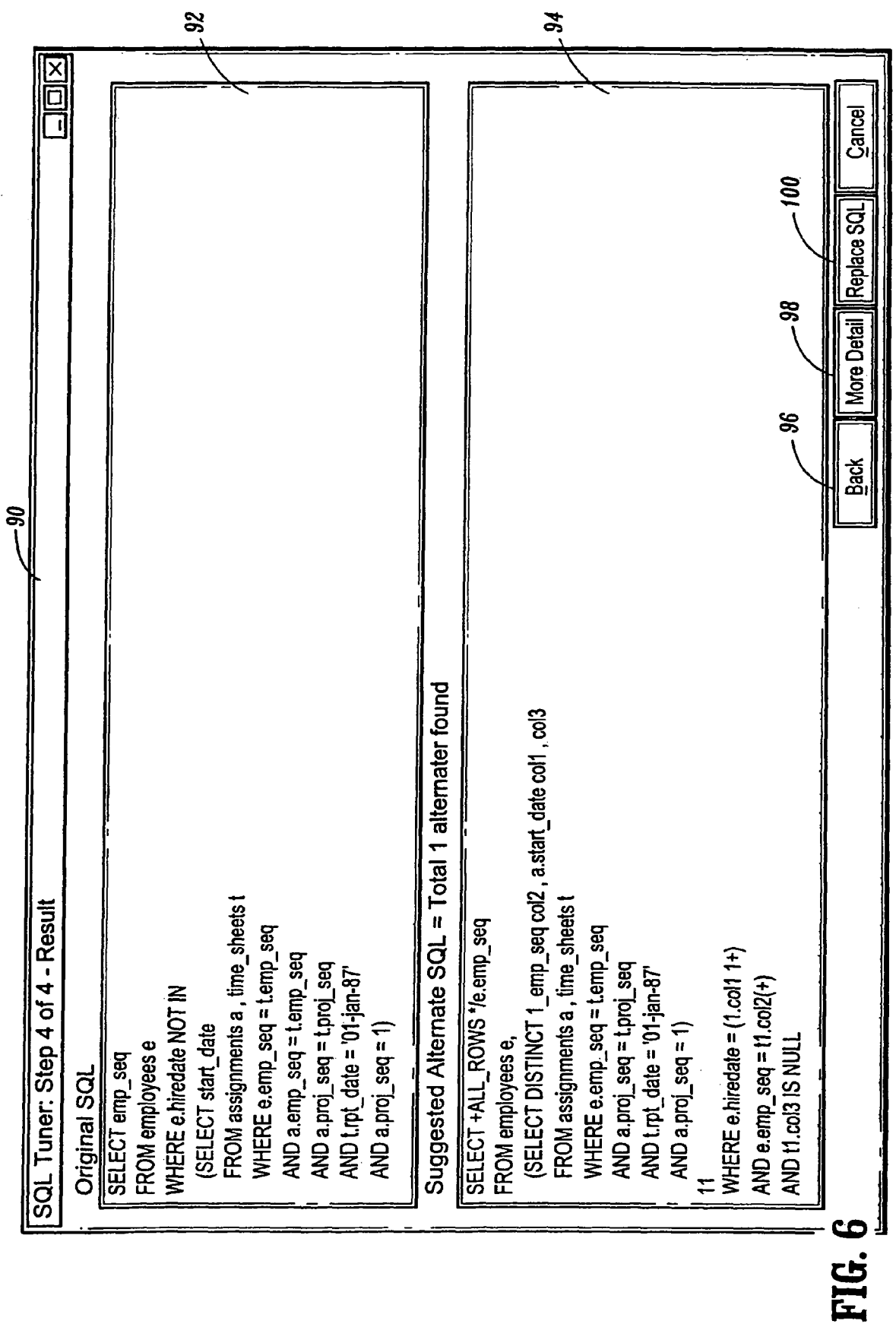
FIG. 6 shows a Result window display.

In step (S18), the present system displays the original SQL statement and the SQL statement with the lowest cost in a Result dialog window 90 such as that shown in FIG. 6. The original SQL statement is displayed in a window portion 92 and the suggested alternative SQL displayed in window portion 94. The user can then compare the suggested alternate SQL statement(s) with the original SQL statement, examine the changes, and then choose whether they want to replace the original SQL statement with the tuned SQL statement.

Figure 7:
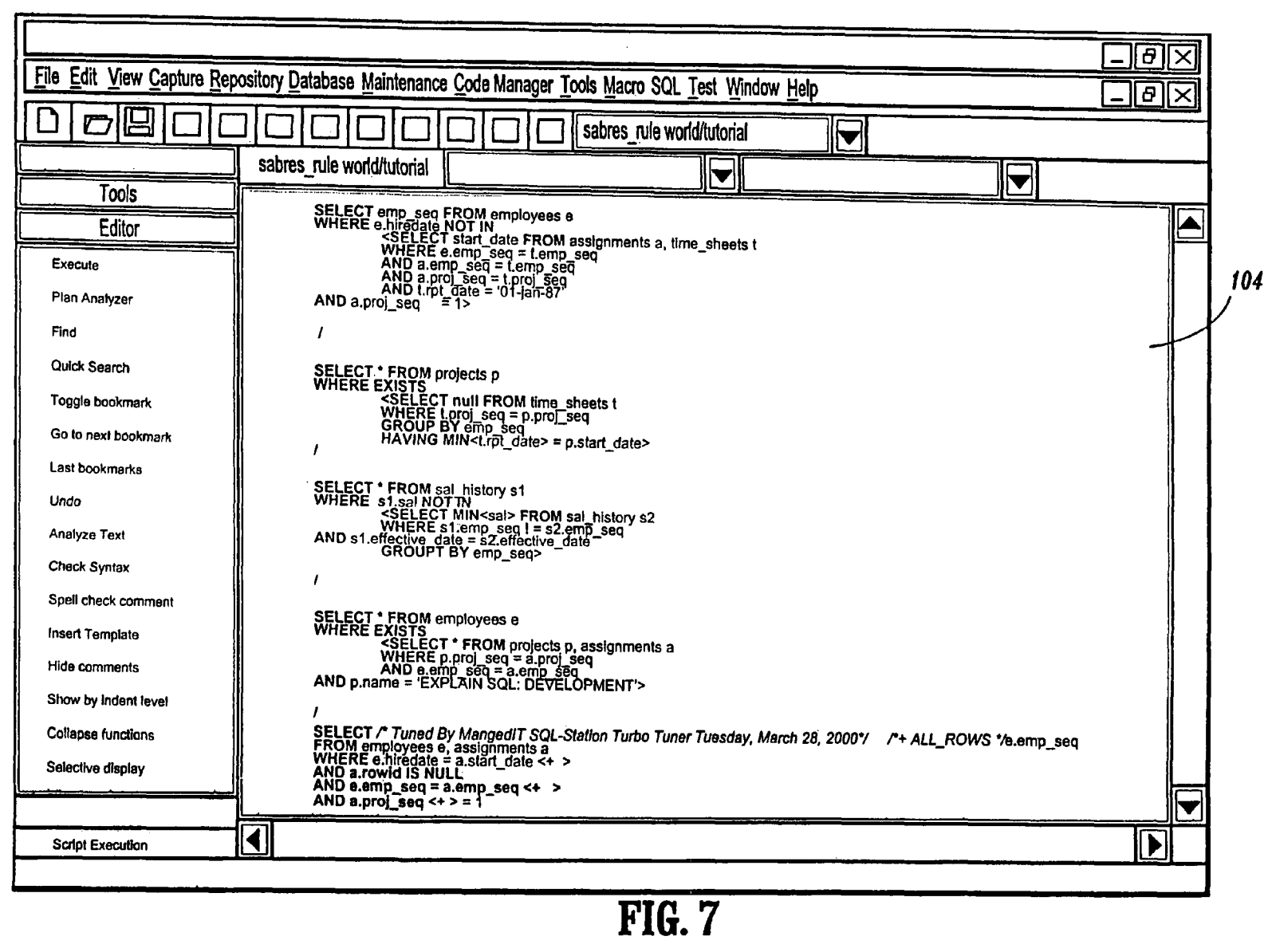
Figure 8:
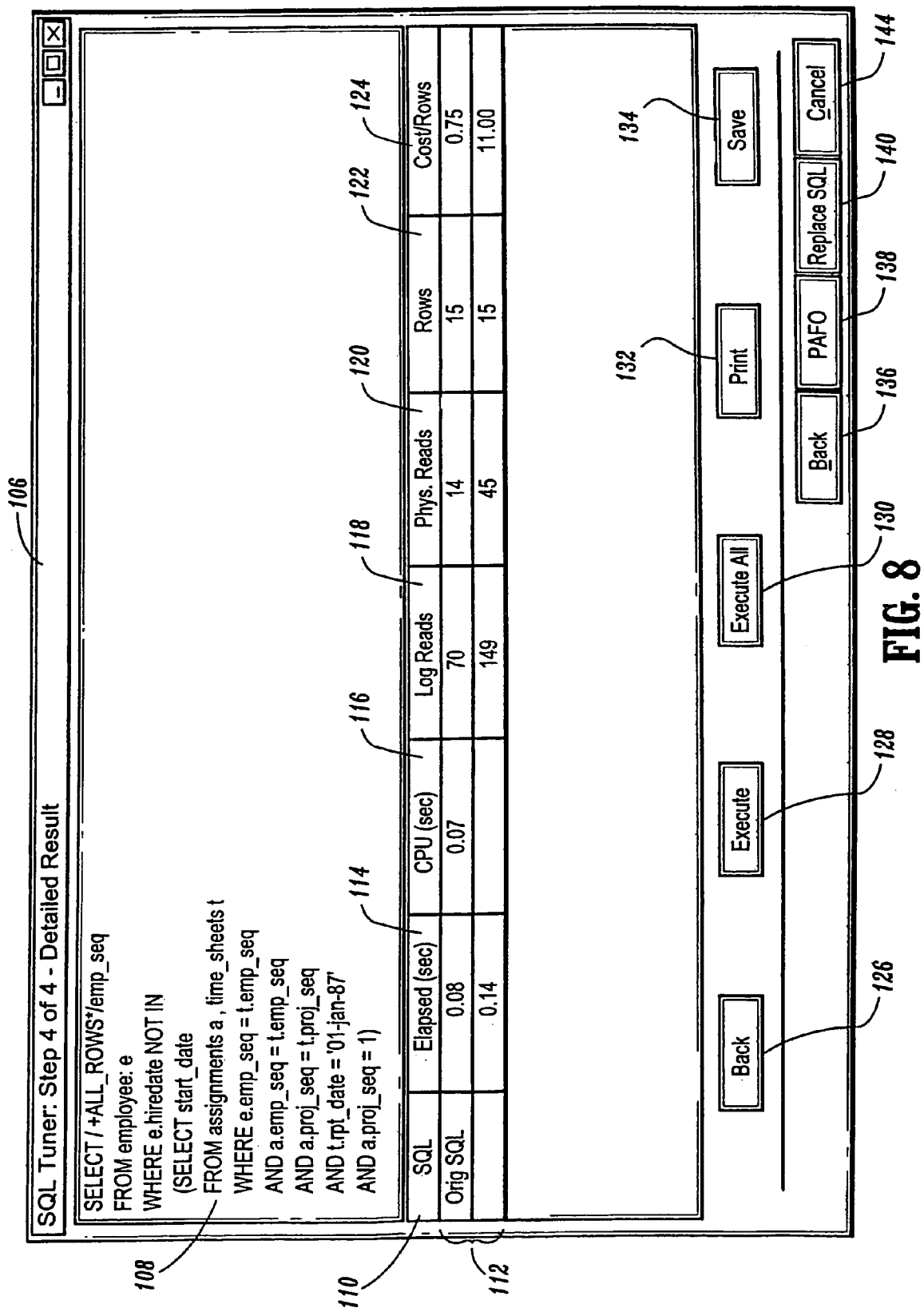
FIG. 8 shows a Detailed Result window display.

Clicking Replace SQL button 100 then replaces the original SQL statement with the suggested alternate SQL statement shown in window 94. The system adds comments and displays the tuned SQL statement in an edit or tuning window 104 as shown in FIG. 7. As shown in FIG. 7, the comments may include a date stamp, information indicating that the statement was tuned and identifying the optimization mode used (ALL-ROWS in this example). Clicking on Back button 96 returns to the previous window. Clicking on More Detail button 98 opens a Detailed Result Window 106 as shown in FIG. 8. The tuned SQL statement is displayed in window portion 108. Row 110 displays the Cost Statistics for the original SQL statement and one or more rows 112 display the cost statistics for the tuned alternate SQL statement(s). The statistics may include Elapsed Time 114 which is the amount of time required to execute the SQL (in seconds). CPU time 116 which is the number of CPU cycles per second required to execute the SQL, Physical reads 120 which is the number of physical reads required to execute the SQL. Rows 122 is the number of rows the SQL returns and Cost Rows 124 is the database's cost divided by the number of rows.

The Detailed Results window 106 enables the user to view cost statistics for each statement to help the user choose the SQL best suited to their needs. The user can also choose to open the tuned statement in a system including an editor function for further editing.

If there is a bind variable in the SQL, clicking on the "Bind" button 126 displays a dialog where the user can specify a value for the variable before executing the SQL statement. Clicking on the "Execute" button 128 generates statistics for the selected statement. Clicking on the "Execute All" button 130 generates statics for all the SQL statements listed. The user can click "Print" button 132 to print the information currently displayed in the window. The user can click on the "Save" button 134 to save the information in this window as a text file for future reference. The user can select an alternate SQL entry in the table and click on the "PAFO" (Plan Analyzer for Oracle) button 138 to display the code in a planner window.

Clicking on the "Replace SQL" button 140 replaces the original SQL with the tuned SQL. Clicking on the "Back" button 136 returns to the Result window 90 (FIG. 6). Clicking on the "Cancel" button 144 exits the present system without changing the original SQL.

The following descriptions list and describe the various terms used throughout the present specification to reference parts or attributes of SQL statements as well as some of the concepts used by the present system for tuning SQL statements. The terms are used throughout the specification in describing the algorithms used by the present system to tune the SQL statements.

A. Branch and Level of Nesting

When a query has subqueries, the path from the top (main query) to the bottom is a "branch". The "level of nesting" is the number of subqueries in the branch. The main query is considered at "level"=1. The subquery directly below it is at "level"=2, and so on. Consider the following SQL, line numbers for which have been added for ease of reference.

```
1.  SELECT * FROM employees
2.  WHERE emp_seq IN
3.     (SELECT emp_seq
4.     FROM time_sheets t
5.     WHERE t.rpt_date = '01-MAY-98'
6.     AND t.proj_seq =
7.        (SELECT proj_seq FROM projects
8.        WHERE name = 'EXPLAIN SQL: DEVELOPMENT'))
9.     AND hiredate > SYSDATE – 10
```

The branch extends from the main query, LEVEL=1 (beginning line 1), to LEVEL=2 (beginning line 3), to LEVEL=3 the last subquery (beginning line 7). The "level of nesting" in this example is 2, since the main query has a subquery and that subquery is turn has a subquery. The following SQL statement contains 2 branches:

```
1.   SELECT * FROM employees
2.   WHERE emp_seq IN
3.      (SELECT emp_seq
4.       FROM time_sheets t
5.       WHERE t.rpt_date = '01-MAY-98'
6.       AND t.proj_seq =
7.          (SELECT proj_seq FROM projects
8.           WHERE name = 'EXPLAIN SQL: DEVELOPMENT'))
9.   AND hiredate > SYSDATE – 10
10.  AND emp_seq IN
11.     (SELECT emp_seq FROM dependents
12.      WHERE birthdate > '01-JAN-67')
```

The first branch in this SQL statement is the same as in the previous example. However, this SQL statement has a second branch. The main query (which begins on line 1) is level 1. Level 2 begins on line 11. This second branch has a level of nesting equal to 1.

B. Top-Most Parent Boolean Operator

When OR operators exist in a WHERE clause, care should be used before merging or moving a subquery into a FROM clause If the OR is a parent Boolean operator, the merge or move should not take place. The following example illustrates this point.

For the SQL statement:

```
SELECT e.emp_seq FROM employees e
WHERE hiredate > SYSDATE – 155
OR emp_seq IN (SELECT emp_seq FROM assignments
    WHERE proj_seq = 1)
```

If we did not consider the OR operator, the subquery could be merged as follows:

```
SELECT e.emp_seq, x.emp_seq FROM employees e,
(SELECT emp_seq FROM assignments
    WHERE proj_seq = 1) x
WHERE e.hiredate > SYSDATE – 155
OR e.emp_seq = x.emp_seq
```

However, the join will now become a Cartesian product when there is no joining row in the subquery. For example, if the criterion "e.emp_seq=x.emp_seq" evaluates to FALSE, but the non-join criterion evaluates to TRUE, the row from the subquery will be joined regardless. And for that specific EMPLOYEES row, the non-join criterion will always evaluate to TRUE regardless of which row from the subquery is joined. This creates the Cartesian product.

The following example illustrates that the problem may become even more difficult when NOTs precede criteria.

For example, given the SQL statement:

```
SELECT e.emp_seq FROM employees e
WHERE NOT(hiredate > SYSDATE – 155
```

```
OR emp_seq IN (SELECT emp_seq FROM assignments
    WHERE proj_seq = 1))
```

The NOT, using DeMorgan's Rule, reverses the enclosed Boolean and relational operators. However, the present system may eliminate the NOT operators by using DeMorgan's rule, resulting in the following SQL.

```
SELECT e.emp_seq FROM employees e
WHERE hiredate <= SYSDATE – 155
AND emp_seq NOT IN (SELECT emp_seq FROM assignments
    WHERE proj_seq = 1)
```

The reversed Boolean and relational operators are underlined. Making the reversals first may simplify the process.

C. Correlated to Multiple SQL Modules

Correlated subqueries can be correlated to more than one SQL module as shown in the following example:

```
1.   SELECT * FROM employees e
2.   WHERE EXISTS
3.      (SELECT null FROM assignments a
4.       WHERE a.emp_seq = e.emp_seq
5.       AND EXISTS
6.          (SELECT null FROM time_sheets t
7.           WHERE t.emp_seq = e.emp_seq
8.           AND t.proj_seq = a.proj_seq))
```

The subquery on TIME_SHEETS (line 6) is correleated (via line 7) to both the surrounding query (on ASSIGNMENTS) and the main query on EMPLOYEES (via line 8).

D. Correlation Criteria

In the above SQL statement the criterion on lines 7 and 8 are called "correlation criteria". These criteria are not "join criteria", but are more like "non-join criteria" in the sense that the reference outside the query (such as "e.emp_seq" or "a.proj_seq") is like a constant when the subquery is executed.

Correlation criteria can be checked in routines to ensure they utilize the equality operator. However, it should be noted that correlation criteria that should be checked this way are those that correspond to the columns comprising a unique index. For example, the following query has 2 correlation criteria in the subquery. However, the only one that matters is the one over PROJ_SEQ, since that is the column having the unique index.

```
SELECT * FROM assignments a
WHERE EXISTS
    (SELECT start_date FROM projects p
     WHERE a.proj_seq = p.proj_seq
     AND a.start_date < p.start_date)
```

E. Non-Join Criteria

In an SQL statement, when the code below references a non-join criterion, it is looking for criterion where the relational operator is '=' and the other operand is either a constant or a subquery. The assumption with the subquery is that since the user specified '=' as the relational operator, the subquery must return at most a single row, which means a constant.

The following are examples of invalid WHERE clauses:

```
WHERE col1 = 10 – col2
   WHERE col1 > 10
The following are examples of valid WHERE clauses:
   WHERE col1 = 10
   WHERE col1 = (select col2 from tab1 )
   WHERE col1 = :Bind_Variable
```

F. Join Criteria

Join criteria are referenced below. In each case the relational operator should be '=', and each side of the criterion should be a single column name and not an expression.

G. Subquery Interface

An interface between a surrounding query and a subquery typically contains at least a "relational operator" such as "IN", "=", "NOT EXISTS", etc. Preceding all but the EXISTS and NOT EXISTS relational operators is one or more columns. The columns preceding the operator are called "interface columns". The columns in the corresponding SELECT list of the subquery are also called "interface columns". These two types of "interface columns" can be distinguished by whether they are interface columns for the surrounding query or the subquery.

It is possible that the columns do no belong to objects within the subquery and are not correlated with any of the columns belonging to the tables in the subquery, as illustrated below:

```
1.  SELECT * FROM employees e
2.  WHERE emp_seq IN
3.     (SELECT emp_seq FROM assignments a
4.     WHERE (e.hiredate, a.proj_seq) IN
5.        (SELECT rpt_date, proj_seq FROM time_sheets t))
```

The column "e.hiredate" (line 4) does not belong to the subquery (ASSIGNMENTS table) and is not correlated with any of the columns in ASSIGNMENTS. This document will refer to these columns of the surrounding query as "foreign". If a column is foreign, the system will attempt to merge it or convert it to a non-correlated subquery. However, the system will not attempt to move that subquery.

H. Preferences

Null logic can present numerous problems when transforming SQL statements. If certain columns are nullable in the surrounding query, different result sets can appear when transformed. The transformation can be modified to ensure this does not happen, although there may be a small cost in terms of performance. The modification is to AND a criterion, specifying that the column can not be null (e.g. col IS NOT NULL). Since that criterion must be validated for each row satisfying the original criteria, there will be a slight cost. On the other hand, in some cases the performance may improve because an optimizer such as ORACLE'S optimizer may now be able to perform an anti-join. These preferences will be references in the algorithms below.

I. Aliases

When a subquery is merged or moved to a FROM clause, the criteria in the surrounding query should be fully identified, via an alias, for example, as will be shown by reference to the following example.

```
1.  SELECT * FROM employees
2.  WHERE emp_seq IN
3.     SELECT emp_seq
4.     FROM time_sheets t, projects p
5.     WHERE t.rpt_date = '01-MAY-98'
6.     AND t.proj_seq = p.proj_seq
7.     AND p.stop_date IS NULL)
8.  AND hiredate > SYSDATE – 10
```

In this example, an alias should be added for EMPLOYEES, and that alias should precede all columns pertaining to that table. In addition, the subquery should be given an alias. Adding an "e" alias for EMPLOYEES, the transformation would then be:

```
SELECT e.* FROM employees e,
   (SELECT emp_seq
   FROM time_sheets t, projects p
   WHERE t.rpt_date = '01-MAY-98'
   AND t.proj_seq = p.proj_seq
   AND p.stop_date IS NULL) x
WHERE e.emp_seq = x.emp_seq
AND e.hiredate > SYSDATE – 10
```

If A subquery contains an aggregate, it should be given an alias before being moved into the FROM clause. For example, the following SQL statement contains a "max" aggreagate function in the subquery (line 3).

```
1.  SELECT * FROM sal_history
2.  WHERE (emp_seq, effective_date) IN
3.     (SELECT emp_seq, max(effective_date)
4.     FROM sal_history
5.     GROUP BY emp_seq)
```

The SQL statement should thus be transformed to give the aggregate "MAX(EFFECTIVE_DATE)" an alias as follows:

```
SELECT s.* FROM sal_history s,
   (SELECT emp_seq, max(effective_date) c1
   FROM sal_history
   GROUP BY emp_seq) x
WHERE s.emp_seq = x.emp_seq
AND s.effective_date = x.c1
```

A question arises whether to allow the user to flag subqueries that are known to return a unique set via implicit knowledge.

For example:

```
SELECT * FROM employees e
WHERE EXISTS
   (SELECT null FROM projects p, assignments a
   WHERE p.proj_seq = a.proj_seq
   AND a.emp_seq = e.emp_seq
   AND p.name = 'EXPLAIN_SQL')
``` can be converted to:

```
SELECT * FROM employees e
WHERE e.emp_seq IN
    (SELECT a.emp_seq FROM projects p, assignments a
    WHERE p.proj_seq = a.proj_seq
    AND p.name = 'EXPLAIN_SQL')
``` or converted to:

```
SELECT e.* FROM employees e, projects p, assignments a
WHERE e.emp_seq = a.emp_seq
AND p.proj_seq = a.proj_seq
AND p.name = 'EXPLAIN_SQL'
```

Both cases are possible because the low level table in the subquery has the PK on PROJ_SEQ and EMP_SEQ. Transitivity allows us to say there is an equality on PROJ_SEQ because of the equality on NAME which also has a UNQ index. Therefore, the subquery is guaranteed to produce one row per EMPLOYEES row, which means a merge is possible.

Now that some of the terminology and concepts used by the present system have been explained, the following examples aid in describing algorithms that may be used by the present system to transform SQL statements. Examples are shown for correlated and non-correlated subqueries and are identified as such. A non-correlated subquery is a subquery that is not correlated to the main query. That is, a non-correlated subquery may logically be executed before any row is examined by the main query. In other words, the subquery is independent of the main query and could exist as a query in its own right. A correlated subquery, on the other hand, depends on the rows being examined by the main query.

1. The following SQL statement is a mix of correlated and non-correlated subqueries. In the following SQL statement, the last subquery is a scalar subquery and since the surrounding subquery has equality criteria on PROJ_and RPT_DATE, and the EMP_SEQ column is on the select list, that subquery can be merged, even though the subquery on SAL_HISTORY can not. This is a good test of whether a nested query in the FROM clause was correctly identified as scalar.

```
SELECT * FROM employees
WHERE emp_seq IN
    (SELECT emp_seq FROM time_sheets t
    WHERE proj_seq =
    (SELECT proj_seq FROM projects
    WHERE name = 'EXPLAIN SQL: DEVELOPMENT')
    AND rpt_date =
    (SELECT MAX(effective_date) FROM sal_history s
    WHERE s.emp_seq = t.emp_seq))
``` should be transformed to

```
SELECT e.* FROM employees e, time_sheets t, projects p,
    (SELECT emp_seq, MAX(effective_date) col1 FROM
    sal_history s GROUP BY emp_seq) x
WHERE e.emp_seq = t.emp_seq
AND t.proj_seq = p.proj_seq
AND p.name = 'EXPLAIN SQL: DEVELOPMENT'
AND t.emp_seq = x.emp_seq
AND t.rpt_date = x.col1
```

2. The following example is non-correlated and is slightly different from the immediately previous example. The basic difference is the subquery on SAL_HISTORY. In this case the subquery initially is determined to potentially return multiple rows. This means a run-time error may be possible in the original query. This prevents merging or moving the subquery. That is, the subquery on SAL_HISTORY should remain as is. However, since the criterion on RPT_DATE has the equality operator, the merge of the subquery with TIME_SHEETS can still occur, and it will potentially still encounter the same run-time error. In other words, the subquery on SAL_HISTORY will not be moved since it can not be guaranteed to produce a scalar set. However, in case it does, it will result in a single constant value for the criterion "rpt_date=_____". The present system will recognize the subquery as being equivalent to a constant, allowing the surrounding query to be merged with it's surrounding query and carrying the nested select along.

For example, the following SQL statement,

```
SELECT * FROM employees
WHERE emp_seq IN
    (SELECT emp_seq FROM time_sheets t
    WHERE proj_seq =
        (SELECT proj_seq FROM projects
        WHERE name = 'EXPLAIN SQL: DEVELOPMENT')
    AND rpt_date =
        (SELECT effective_date FROM sal_history s
        WHERE sal > 100)
``` should be transformed to

```
SELECT e.* FROM employees e, time_sheets t, projects p
WHERE e.emp_seq = t.emp_seq
AND t.proj_seq = p.proj_seq
AND p.name = 'EXPLAIN SQL: DEVELOPMENT'
AND t.rpt_date =
    (SELECT effective_date FROM sal_history s
    WHERE sal > 100)
```

3. The following example is correlated and deals with the ALL operator. If a subquery does not return any rows, the criterion may evaluate to TRUE. This means the subquery should be moved only and done as an outer join where only the outer-join syntax is only applied to the initial correlation criteria. The original columns compared must account for no join match. The final criterion added is evaluated after the outer-join takes place.

For example, the following SQL statement,

```
SELECT emp_seq, birthdate FROM employees e
WHERE birthdate < ALL
    (SELECT birthdate FROM dependents d
    WHERE e.emp_seq = d.emp_seq)
``` can be transformed to

```
SELECT e.emp_seq. e.birthdate FROM employees e.
    (SELECT d.emp_seq. MIN(birthdate) col1. 1 col2 FROM
    dependents d GROUP BY emp_seq) x
```

```
    WHERE e.emp_seq = x.emp_seq(+)
    AND (e.birthdate < x.col1 OR x.col2 IS NULL)
```

The system should check to determine if any of the new outer-joined criteria are OR'ed to anything, since that would produce a parse error. It may be desirable to have the database parse the intermediate solution to see if the transformation should have been done. If it should not have been done then nothing should be done with the subquery.

4. The following query is non-correlated and deals with subqueries that have GROUP BY syntax. Even though the subquery has a GROUP BY clause, the SELECT list does not contain each of the columns on the GROUP BY list. This means the potential does exist for duplicates unless the DISTINCT keyword is added to the SELECT list of the subquery. For example, the following SQL statement.

```
    SELECT * FROM employees
    WHERE emp_seq IN
        (SELECT emp_seq FROM assignments
        GROUP BY emp_seq, proj_seq)
``` can be transformed to

```
    SELECT e.* FROM employees e.
        (SELECT DISTINCT a.emp_seq FROM assignments a
        GROUP BY a.emp_seq, a.proj_seq) x
    WHERE e.emp_seq = x.emp_seq
```

5. A SQL statement may contain only aggregates, but no GROUP BY clause. Therefore it does not require the DISTINCT keyword. This example is non-correlated.

The following SQL statement.

```
    SELECT * FROM employees
    WHERE hiredate =
        (SELECT MIN(effective_date) FROM sal_history)
``` can be transformed to

```
    SELECT e.* FROM employees e.
        (SELECT MIN(s.effective_date) col1 FROM sal_history s) x
    WHERE e.hiredate = x.col1
```

6. The following example is non-correlated and illustrates handling the NOT IN operator when moving to the surrounding query. The basic points are that the system should convert to an outer join and then look for rows that are the "outer-joined rows" (e.g., where a not nullable column on the select list of the subquery IS NULL (see the criterion "x.col1 IS NULL" below)). A solution is to add a constant to the Select list, such as 1, because that will work whether or not the subquery has GROUP BY syntax.

For example, the following SQL statement,

```
    SELECT emp_seq FROM employees
    WHERE hiredate NOT IN
        (SELECT effective_date FROM sal_history)
``` can be transformed to

```
    SELECT e.emp_seq FROM employees e.
        (SELECT DISTINCT effective_date. 1 col1 FROM sal_history) x
    WHERE e.hiredate = x.effective_date(+)
    AND x.col1 IS NULL
```

7. The following example is similar to example 6 above and is also non-correlated. However, in this example multiple columns are interfaced to the subquery. In addition, the columns represent multiple tables in the surrounding query. In this example, a problem may be encountered since the transformation does not parse. An error message may be generated "ORA-01417: a table may be outer joined to at most one other table". The reason is that X is outer-joined to EMPLOYEES and DEPENDENTS. Accordingly, this transformation should not be made when the relational operator requires an outer join but the columns interfacing the subquery are from multiple tables.

For example, the following SQL statement,

```
    SELECT e.emp_seq FROM employees e. dependents d
    WHERE (e.hiredate. d.birthdate) NOT IN
        (SELECT hiredate. d1.birthdate. FROM employees e1. dependents d1
        WHERE e1.emp_seq = 1001
        AND e1.emp_seq = d1.emp_seq
        AND relation = 'SPOUSE')
    AND e.emp_seq = d.emp_seq
    AND d.relation = 'SPOUSE'
``` would be transformed INCORRECTLY to

```
    SELECT e.emp_seq FROM employees e. dependents d.
        (SELECT DISTINCT e1.hiredate. d1.birthdate. 1 col1
        FROM employees e1. dependents d1
        WHERE e1.emp_seq = 1001
        AND e1.emp_seq = d1.emp_seq
        AND d1.relation = 'SPOUSE') x
    WHERE e.emp_seq = d.emp_seq
    AND d.relation = 'SPOUSE'
    AND e.hiredate = x.hiredate(+)
    AND d.birthdate = x.birthdate(+)
    AND x.col1 IS NULL
```

8. The following non-correlated example provides an interesting through strange situation. This situation is seldom seen although, in theory, it can occur. The reason is that the subquery below is non-correlated but interfaced to the surrounding query with the EXISTS operator. The EXISTS operator is generally only used with a correlated subquery. In any even, the transformation is simple; just move it to the surrounding query with no join clause, and add the criterion, "ROW NUM=1" as shown below, into the subquery.

For example, the following SQL statement,

```
SELECT * FROM employees
WHERE EXISTS
    (SELECT * FROM sal_history
     WHERE sal < 0)
``` can be transformed to

```
SELECT e.* FROM employees e.
    (SELECT * FROM sal_history
     WHERE sal < 0
     AND ROWNUM = 1)
```

The performance will be tremendously better with the transformed SQL statement than with the original SQL statement, since the subquery is now only executed once, instead of once per row as would be performed in the original SQL statement.

9. The following example is non-correlated and is listed because the subquery contains more than one column name with the same name. Even though the column name is preceded by the table alias. The column names should be given an alias. Also the asterisk on the SELECT list of the surrounding query should be duplicated for each table in the surrounding query. Note the underlined items in the transformation shown below.

The SQL statement,

```
SELECT * FROM employees e. dependents d
WHERE e.emp_seq = d.emp_seq
AND (e.birthdate. d.birthdate) IN
    (SELECT e1.birthdate. d1.birthdate
     FROM employees e1. dependents d1
        WHERE e1.emp_seq = d1.emp_seq
        AND e1.hiredate = SYSDATE – 100)
``` can transformed to

```
SELECT e.*.d.* FROM employees e, dependents d,
    (SELECT DISTINCT e1.birthdate col1, d1.birthdate col2
     FROM employees e1, dependents d1
     WHERE e1.emp_seq = d1.emp_seq
     AND e1.hiredate = SYSDATE – 100) x
WHERE e.emp_seq = d.emp_seq
AND e.birthdate = x.col1
AND d.birthdate = x.col2
```

10. The following example is non-correlated and illustrates a scalar subquery and the NOT IN operator. Since the subquery is scalar, it can be merged with the surrounding as an outer-join. The key is to retain only the "outer-joined" rows, this can be accomplished by ANDing a criterion with a non-null column of the table in the subquery and the IS NULL operator. An even better solution may be to use the ROWID (see the second transformation below).

For example,

```
SELECT emp_seq FROM employees
WHERE hiredate NOT IN
    (SELECT hiredate FROM employees
     WHERE emp_seq = 999)
``` can transformed to

```
SELECT e.emp_seq FROM employees e, employees e1
WHERE e.hiredate = e1.hiredate(+)
AND e1.emp_seq(–) = 999
AND e1.emp_seq IS NULL
```

```
SELECT e.emp_seq FROM employees e, employees e1
WHERE e.hiredate = e1.hiredate(–)
AND e1.emp_seq(–) = 999
AND e1.rowid IS NULL
```

11. The following correlated example contains both correlation criteria and non-join criteria. Since the subquery guarantees uniqueness the subquery can be merged.

For example, the SQL statement.

```
SELECT * FROM employees e
WHERE EXISTS
    (SELECT * FROM projects p, assignments a
     WHERE p.proj_seq = a.proj_seq
     AND e.emp_seq = a.emp_seq
     AND p.name = 'EXPLAIN SQL: DEVELOPMENT')
``` can be transformed to

```
SELECT e.* FROM employees e, projects p, assignments a
WHERE p.proj_seq = a.proj_seq
AND e.emp_seq = a.emp_seq
AND p.name = 'EXPLAIN SQL: DEVELOPMENT'
```

12. The following correlated example is different because the SELECT list contains columns that are not returned to the surrounding query. (In fact, if the subquery in the immediately preceding example 11 had items on the select list, the transformation would still be exactly the same. Note that in the immediately preceding example 11 the asterisk on the subqueries select list did not matter.)

For example,

```
SELECT * FROM employees e
WHERE EXISTS
    (SELECT relation FROM dependents d
     WHERE e.emp_seq = d.emp_seq)
``` can be transformed to

```
SELECT e.* FROM employees e.
    (SELECT DISTINCT emp_seq FROM dependents d) x
    WHERE e.emp_seq = x.emp_seq
```

13. This correlated example is different from the immediately preceding example because the SELECT list columns have corresponding columns in the surrounding query.

For example,

```
SELECT * FROM sal_history s1
    WHERE effective_date >
        (SELECT MAX(effective_date) FROM sal_history s2
        WHERE s1.emp_seq = s2.emp_seq)
``` can transformed to

```
SELECT s1.* FROM sal_history s1.
    (SELECT emp_seq, MAX(effective_date) col1 FROM sal_history s2
        GROUP BY emp_seq) x
    WHERE s1.emp_seq = x.emp_seq
    AND s1.effective_date > x.col1
```

14. The following non-correlated example illustrates a non-correlated subquery interfaced via the NOT EXISTS operator.

For example,

```
SELECT * FROM employees
    WHERE NOT EXISTS (SELECT * FROM dependents)
``` can transformed to

```
SELECT e.* FROM employees e.
    (SELECT count(*) col1 FROM dependents WHERE ROWNUM = 1) x
    WHERE x.col1 = 0
```

Note that the SELECT list of the original subquery is changed to "COUNT(*)", and the "ROWNUM=1" criterion is added to the subquery.

15. The following non-correlated example is similar to the immediately preceding example 14, except that the subquery contains a GROUP BY. The transformation is similar to the immediately preceding example 14.

For example,

```
SELECT * FROM employees
    WHERE NOT EXISTS
        (SELECT null FROM sal_history
        GROUP BY emp_seq)
``` can transformed to

```
SELECT e.* FROM employees e.
    (SELECT count(*) col1 FROM sal_history
    WHERE ROWNUM = 1
    GROUP BY emp_seq) x
    WHERE x.col1 = 0
```

Whatever was on the SELECT list of the subquery is swapped with "COUNT(*)".

16. The following is a CORRELATED example using the NOT EXITS operator.

For example,

```
SELECT emp_seq FROM employees e
    WHERE NOT EXISTS
        (SELECT * FROM sal_history s
        WHERE e.emp_seq = s.emp_seq
        AND effective_date = SYSDATE)
``` can be transformed to

```
SELECT e.emp_seq FROM employees e. sal_history s
    WHERE e.emp_seq = s.emp_seq(+)
    AND effective_date(-) = SYSDATE
    AND s.emp_seq IS NULL
```

17. The following correlated example illustrates a set subquery interfaced with the IN operator.

For example,

```
SELECT * FROM sal_history s1
    WHERE effective_date IN
        (SELECT effective_date FROM sal_history s2
        WHERE s1.emp_seq = s2.emp_seq
        AND sal > 100)
``` can be transformed to

```
SELECT s1.* FROM sal_history s1, sal_history s2
    WHERE s1.effective_date = s2.effective_date
    AND s1.emp_seq = s2.emp_seq
    AND s2.sal > 100
```

18. The following non-correlated example illustrates the <ALL operator.

For example,

```
SELECT * FROM employees
    WHERE hiredate ALL
        (SELECT hiredate FROM employees
        WHERE birthdate > '01-JAN-87')
``` can be transformed to

```
SELECT e.* FROM employees e.
    (SELECT MIN(hiredate col1 FROM employees
        WHERE birthdate > '01-JAN-87') x
    WHERE (hiredate x.col1 OR x.col1 IS NULL)
```

Note the use of the "x.col1 IS NULL" in the transformation. The point is that an aggregate function will always return a value even if no rows qualify the criteria. Since the ALL operator always evaluates to TRUE when the subquery results in an empty set, the system should still return the row in the surrounding query.

19. The following non-correlated example is similar to the immediately preceding example 18. However in this example, the >ALL operator is used instead of <ALL.
For example,

```
SELECT * FROM employees
    WHERE hiredate > ALL
    (SELECT hiredate FROM employees
        WHERE birthdate > '01-JAN-77')
``` can be transformed to

```
SELECT e.* FROM employees e.
    (SELECT MAX(hiredate) col1 FROM employees
        WHERE birthdate > '01-JAN-77') x
    WHERE (hiredate > x.col1 OR x.col1 IS NULL)
```

20. The following non-correlated example includes a set subquery that is merge-able.
For example,

```
SELECT * FROM employees
    WHERE emp_seq NOT IN
    (SELECT emp_seq FROM sal_history
        WHERE effective_date = '5-JUL-98')
``` can be transformed to

```
SELECT e.* FROM employees e. sal_history s
    WHERE e.emp_seq = s.emp_seq (+)
    AND effective_date(-) = '5-JUL-98'
    AND s.emp_seq IS NULL
```

21. The following correlated example is similar to the immediately preceding example 20. except correlated. The example illustrates how to add outer-join syntax to the correlation criteria.
For example,

```
SELECT * FROM assignments a
    WHERE start_date NOT IN
    (SELECT effective_date FROM sal_history s
        WHERE a.emp_seq = s.emp_seq)
``` can be transformed to

```
SELECT a.* FROM assignments a, sal_history s
    WHERE a.start_date = s.effective_date(-)
    AND a.emp_seq = s.emp_seq(+)
    AND s.emp_seq IS NULL
```

22. The following non-correlated example is similar to the immediately preceding example 21. However, in this example, the subquery has multiple tables. The example below illustrates how to place the outer-join syntax on the join criteria within the subquery when merged to the surrounding query.
For example,

```
SELECT * FROM status_list
    WHERE status s NOT IN (SELECT p.status
        FROM projects p, assignments a
        WHERE a.proj_seq = p.proj_seq
        AND p.name = 'EXPLAIN SQL: DEVELOPMENT')
``` can be transformed to

```
SELECT s.* FROM status_list s, projects p, assignments a
    WHERE s.status = p.status(+)
    AND p.name(-) = 'EXPLAIN SQL: DEVELOPMENT'
    AND a.proj_seq(-) = p.proj_seq
    AND a.ROWID IS NULL
```

In the subquery, uniqueness is guaranteed on the intermediately joined table (alias "p" in this case since p.name is unique). At most 1 lowest level child in the join order can be non-unique, alias "a" in this case. The join order is alias "s", then "p", then "a".

23. The following correlated example may be rather complicated may be rather complicated. It should be an outer-join because of the NOT IN operator. However, the problem is that both aliases "e" and "a" are correlated with the subquery. The subquery should be mergable because the subquery contains only 1 table so we do not need to guarantee uniqueness.
For example,

```
SELECT * FROM employees e, assignments a
    WHERE e.emp_seq = a.emp_seq
    AND e.emp_seq NOT IN
    (SELECT t.emp_seq FROM time_sheets t
        WHERE a.proj_seq = t.proj_seq
        AND t.rpt_date = '20-FEB-94')
```

The subquery can neither be merged nor moved because of the correlation criteria. If the subquery's correlation criteria and interface columns reference more than one table in surrounding query, the subquery can be skipped. In this case the one correlation criterion references alias "a" and the interface of the surrounding query references "e.emp._seq". If the system were to transform the subquery, the transformation would end up with TIME_SHEET being outer-joined to more than 1 table which is not valid.

The above SQL statement would thus be INCORRECTLY merged to:

```
SELECT * FROM employees e, assignments a, time_sheets t
WHERE e.emp_seq = a.emp_seq
AND e.emp_seq = t.emp_seq(+)
AND a.proj_seq = t.proj_seq(+)
AND t.rpt_date(-) = '20-FEB-94'
AND t.emp_seq IS NULL
``` and is INCORRECTLY moved to

```
SELECT * FROM employees e, assignments a,
        (SELECT t.emp_seq, t.proj_seq, 1 col1 FROM time_sheets t
         WHERE t.rpt_date = '20-FEB-94') x
WHERE e.emp_seq = a.emp_seq
AND e.emp_seq = x.emp_seq(+)
AND a.proj_seq = x.proj_seq(+)
AND x.col1 IS NULL
```

Both of these cases result in an illegal outer-join and should be avoided.

24. This correlated example is similar to example 23 immediately above. Through transitivity the system can transform the original statement as shown in example 23 to the following original statement and then performs the transformation, thus eliminating the restriction encountered in example 23.

For example, the original statement in example 23 can be transformed to:

```
SELECT * FROM employees e, assignments a
WHERE e.emp_seq = a.emp_seq
AND a.emp_seq NOT IN
    (SELECT t.emp_seq FROM time_sheets t
     WHERE a.proj_seq = t.proj_seq
     AND t.rpt_date = '20-FEB-94')
``` which in turn could be transformed to

```
SELECT * FROM employees e, assignments a, time_sheets t
WHERE e.emp_seq = a.emp_seq
AND e.emp_seq = t.emp_seq(+)
AND a.proj_seq = t.proj_seq(+)
AND t.rpt_date(-) = '20-FEB-94'
AND t.emp_seq IS NULL
```

25. The following correlated example deals with the scalar operator, "=". This example shows how transitivity in the subquery may be used to determine the subquery is scalar; e.g. "e.emp_seq=t.emp_seq".

For example,

```
SELECT * FROM time_sheets t, projects p
WHERE t.proj_seq = p.proj_seq
AND t.rpt_date =
    (SELECT hiredate FROM employees e, assignments a
     WHERE a.proj_seq = p.proj_seq
     AND e.emp_seq = a.emp_seq
     AND e.emp_seq = t.emp_seq)
``` could be transformed to

```
SELECT * FROM time_sheets t, projects p, employees e, assignments a
WHERE t.proj_seq = p.proj_seq
AND t.rpt_date = e.hiredate
AND a.proj_seq = p.proj_seq
AND e.emp_seq = t.emp_seq
AND e.emp_seq = a.emp_seq
```

26. The following correlated example deals with the set operator, "IN".

For example,

```
SELECT * FROM employees e
WHERE emp_seq IN
    (SELECT a.emp_seq FROM assignments a, time_sheets t
     WHERE a.emp_seq = t.emp_seq
     AND a.proj_seq = t.proj_seq
     AND a.proj_seq = 1
     AND t.rpt_date = '20-FEB-94')
``` could be transformed to

```
SELECT * FROM employees e, assignments a, time_sheets t
WHERE e.emp_seq = a.emp_seq
AND a.emp_seq = t.emp_seq
AND a.proj_seq = t.proj_seq
AND a.proj_seq = 1
AND t.rpt_date = '20-FEB-94'
```

27. The following correlated example shows where the merge is possible although the correlation criteria involves more than one of the tables in the subquery. In this case, "t." interfaces "e."via the interface to the subquery; then "t." correlates with "a." via the PROJ_SEQ column. Transitivity can be applied so "t" correlates with "a" via both the PROJ_SEQ and EMP_SEQ columns. Moreover, uniqueness is guaranteed on "e" and "a" when joined.

For example,

```
SELECT * FROM time_sheets t
WHERE t.rpt_date NOT IN
    (SELECT hiredate FROM employees e, assignments a
     WHERE a.proj_seq = t.proj_seq
     AND e.emp_seq = a.emp_seq
     AND e.emp_seq = t.emp_seq)
``` can be transformed to

```
SELECT t.* FROM time_sheets t, employees e, assignments a
WHERE t.rpt_date = e.hiredate(+)
AND t.emp_seq = e.emp_seq(+)
AND t.proj_seq = a.proj_seq(+)
AND t.emp_seq = a.emp_seq(+)
AND (a.emp_seq IS NULL OR e.emp_seq IS NULL)
```

Since "a" and "e" are joined to "t" separately, the system needs to add IS NULL to a non-nullable column of each table and OR them together.

28. The following correlated example illustrates an aggregate on the SELECT list of a subquery with a GROUP BY clause.

For example,

```
SELECT * FROM sal_history s
  WHERE effective_date IN
    (SELECT MAX(start_date) FROM assignments a
     WHERE s.emp_seq = a.emp_seq
     GROUP BY proj_seq)
``` can be transformed to

```
SELECT * FROM sal_history s,
  (SELECT DISTINCT emp_seq, MAX(start_date) col1 FROM
   assignments a GROUP BY proj_seq, emp_seq) x
  WHERE s.emp_seq = x.emp_seq
  AND effective_date = x.col1
```

29. The following non-correlated example illustrates transforming an aggregate into an aggregate of an aggregate when the subquery is moved.
For example,

```
SELECT * FROM assignments a
  WHERE start_date < ANY
    (SELECT MIN(rpt_date) FROM time_sheets
     GROUP BY proj_seq)
``` can be transformed to

```
SELECT * FROM assignments a,
  (SELECT MAX(MIN(rpt_date)) col1 FROM time_sheets
   GROUP BY proj_seq) x
  WHERE a.start_date < x.col1
```

30. The following correlated example illustrates when a subquery interfaced through an operator like "ANY" cannot be transformed.
For example,

```
SELECT * FROM assignments a
  WHERE start_date < ANY
    (SELECT MIN(rpt_date) FROM time_sheets t
     WHERE a.emp_seq = t.emp_seq
     GROUP BY proj_seq)
``` would be INCORRECTLY transformed to

```
SELECT * FROM assignments a,
  (SELECT emp_seq, MIN(rpt_date) col1 FROM time_sheets t
   GROUP BY proj_seq, emp_seq) x
  WHERE a.start_date < x.col1
  AND a.emp_seq = x.emp_seq
```

This transformation is incorrect because the subquery is still a set, not a salary as required, e.g., per IMP_SEQ, there are still potentially many MIN(rpt_date) values due to the GROUPing by PROJ_SEQ. Even if the subquery did not have the GROUP BY clause, the transformation would still not be readily possible because the transformation would require putting the correlation columns on the SELECT list and making the aggreagate, and aggreagate of an aggreagate. That would end with the syntax violation of a scalar and an aggregate of an aggregate.

Although the original GROUP by column was not correlated nor part of a HAVING clause, the system cannot get rid of it.

For example, the query could be incorrectly transformed to

```
SELECT e.* FROM employees e,
  (SELECT emp_seq, MAX(rpt_date) col1 FROM time_sheets t
   GROUP BY t.emp_seq) x
  WHERE e.emp_seq = x.emp_seq
  AND e.hiredate < x.col1
```

The above transformation is incorrect because with the same PROJ_SEQ, there could be a part-date less than e.hiredate but another rpt_date greater than e.hiredate. In the original query, the subquery with MIN(rpt_date) will return the first data as on of the rows. However, in the above query, the subquery will return the maximum.

31. The following correlated example is an excellent example where the subquery can not be moved because of the correlation criteria using the "<" operator, instead of the "=" operator.
For example,

```
SELECT * FROM sal_history s1, employees e
  WHERE e.emp_seq = s1.emp_seq
  AND s1.effective_date =
    (SELECT MIN(s2.effective_date)
     FROM sal_history s2
     WHERE e.emp_seq = s2.emp_seq
     AND e.hiredate < s2.effective_date)
``` would be INCORRECTLY transformed to

```
SELECT * FROM sal_history s1, employees e,
  (SELECT s2.emp_seq, s2.effective_date, MIN(s2.effective_date) col1
   FROM sal_history s2
   GROUP BY s2.emp_seq, s2.effective_date) x
  WHERE e.emp_seq = x.emp_seq
  AND s1.effective_date = x.col1
  AND e.hiredate < x.effective_date
```

One way to make a correct transformation would be to move the table that is involved i the non-equality correlation, into the subquery follows:

```
SELECT * FROM sal_history s1.
  (SELECT e.emp_seq, MIN(s2.effective_date) col1
   FROM sal_history s2. employees e
   WHERE e.emp_seq = s2.emp_seq
   AND e.hiredate < s2.effective_date
   GROUP BY e.emp_seq) x
  WHERE s1.emp_seq = x.emp_seq
  AND s1.effective_date = x.col1
```

The solution is to move the EMPLOYEES table into the subquery, and then move the subquery.

32. The following correlated example is a scalar subquery without an aggregate.
For example,

```
SELECT * FROM sal_history s
WHERE effective_date =
    (SELECT hiredate FROM employees e
    WHERE s.emp_seq = e.emp_seq)
``` can be transformed to

```
SELECT s.* FROM sal_history s, employees e
WHERE s.effective_date = e.hiredate
AND s.emp_seq = e.emp_seq
```

33. The following correlated example is similar to the immediately preceding example 32. However, in this example there is additional correlation criterion on column not part of a unique key. This may be important when dealing with correlated subqueries; that is that the correlation criteria over the PK or UNQ key of the subquery should utilize the "=" operator, and the operator used for additional correlation criteria doesn't matter. In this case the correlation criterion "t.rpt_date>=a.start_date" is not part of the unique key.
For example,

```
SELECT * FROM time_sheets t
WHERE rpt_date <
    (SELECT stop_date FROM assignments a
    WHERE a.emp_seq = t.emp_seq
    AND a.proj_seq = t.proj_seq
    AND t.rpt_date >= a.start_date)
``` can be transformed to

```
SELECT t.* FROM time_sheets t, assignments a
WHERE t.rpt_date < a.stop_date
AND a.emp_seq = t.emp_seq
AND a.proj_seq = t.proj_seq
AND t.rpt_date >= a.start_date
```

34. The following correlated example utilizes a scalar operator to interface a scalar subquery, where the subquery is scalar due to the aggregate and no GROUP BY clause.
For example,

```
SELECT * FROM employees e
WHERE hiredate >
    (SELECT MIN(effective_date) FROM sal_history s
    WHERE e.emp_seq = s.emp_seq)
``` can be transformed to

```
SELECT e.* FROM employees e.
    (SELECT emp_seq, MIN(effective_date) col1 FROM
    sal_history s
```

```
    GROUP BY emp_seq) x
WHERE e.emp_seq = x.emp_seq
AND e.hiredate > x.col1
```

35. The following correlated example illustrates correlation in a HAVING clause. The solution is that the HAVING clause becomes a criterion in the surrounding query, and the local item compared in the correlated criterion should appear in the SELECT list of the subquery. It should be noted that another syntax ti check out will be where the subquery has no GROUP BY but does have a HAVING clause.
For example,

```
SELECT * FROM employees e
WHERE NOT EXISTS
    (SELECT a.proj_seq FROM assignments a, time_sheets t
    WHERE a.proj_seq = t.proj_seq
    AND a.emp_seq = t.emp_seq
    AND e.emp_seq = a.emp_seq
    GROUP BY a.proj_seq
    HAVING MIN(t.rpt_date) < e.hiredate)
``` can be translated to

```
SELECT * FROM employees e,
    (SELECT a.proj_seq, a.emp_seq, MIN(t.rpt_date) col1, 1 col2
    FROM assignments a, time_sheets t
    WHERE a.proj_seq = t.proj_seq
    AND a.emp_seq = t.emp_seq
    GROUP BY a.proj_seq, a.emp_seq) x
WHERE e.emp_seq = x.emp_seq(+)
AND x.col1 < e.hiredate(+)
AND x.col2 IS NULL
```

36. The following is a correlated example where the operator is the NOT IN operator and there are non-equality correlation criteria. The system should notice that it doesn't have to move another copy of the EMP_SEQ column onto the GROUP BY clause because it is already there.
For example,

```
SELECT * FROM sal_history s1
WHERE s1.sal NOT IN
    (SELECT MIN(sal) FROM sal_history s2
    WHERE s1.emp_seq != s2.emp_seq
    AND s1.effective_date = s2.effective_date
    GROUP BY emp_seq)
``` can be transformed to

```
SELECT s1.* FROM sal_history s1,
    (SELECT emp_seq, effective_date, MIN(sal) col1, 1 col2
    FROM sal_history s2
    GROUP BY emp_seq, effective_date) x
WHERE s1.sal = x.col1(+)
AND s1.emp_seq != x.emp_seq(-)
AND s1.effective_date = x.effective_date(+)
AND x.col2 IS NULL
order by s1.emp_seq, s1.effective_date
```

37. This correlated example is similar to example 30 above, except that in example 30 the subquery does not have an aggreagate. Though this query may not be practical, the example is used to illustrate why a subquery with a GROUP BY should not be moved for any of the ANY, SOME or ALL operators.

For example,

```
SELECT * FROM assignments a
  WHERE start_date < ALL
    (SELECT rpt_date FROM time_sheets t
     WHERE a.emp_seq = t.emp_seq
     GROUP BY rpt_date
     HAVING COUNT(*) > 1)
``` would be INCORRECTLY transformed to

```
SELECT a.* FROM assignments a,
  (SELECT MIN(rpt_date) col1, emp_seq, 1 col2 FROM time_sheets t
    WHERE a.emp_seq = t.emp_seq
    GROUP BY rpt_date, emp_seq
    HAVING COUNT(*) > 1) x
WHERE (start_date < x.col1 OR x.col2 IS NULL)
AND a.emp_seq = x.emp_seq(+)
```

The problem is that there was already a grouping by RPT_DATE, and there is no join criteria to the surrounding query. Thus we end up with a set per join over EMP_SEQ when we need a scalar.

38. The following correlated example illustrates where a ANY, SOME or ALL subquery cannot be moved due to inequality correlation criteria. To be moved, the final transformation should ensure that at most one row will be compared to the original surrounding query. However, with the non-equality join criterion in the transformation, multiple rows may be joined.

For example,

```
SELECT * FROM sal_history s1
  WHERE sal < ANY
    (SELECT sal FROM sal_history s2
     WHERE s1.emp_seq != s2.emp_seq
     AND s1.effective_date = s2.effective_date)
``` would be INCORRECTLY translated to

```
SELECT s1.* FROM sal_history s1,
  (SELECT emp_seq, effective_date, MAX(sal) col1
   FROM sal_history s2) x
WHERE s1.sal < x.col1
AND s1.emp_seq != x.emp_seq
AND s1.effective_date = x.effective_date
```

39. The following is a correlated example with the ">ALL" operator. This example is similar to example three above, except this example uses the MAX function instead of MIN function.

For example,

```
SELECT emp_seq, birthdate FROM employees e
  WHERE birthdate > ALL
    (SELECT birthdate FROM dependents d
     WHERE e.emp_seq = d.emp_seq)
``` can be transformed to

```
SELECT e.emp_seq, e.birthdate FROM employees e.
  (SELECT d.emp_seq, MAX(birthdate)
   col1, 1 col2 FROM dependents d
   GROUP BY emp_seq) x
WHERE e.emp_seq = x.emp_seq(+)
AND (e.birthdate > x.col1 OR x.col2 IS NULL)
```

40. The following correlated example illustrates the "<ANY" operator. The only difference between the <ANY and the ">ANY" operator is that the MAX becomes a MIN.

For example,

```
SELECT * FROM sal_history s1
  WHERE emp_seq = 1001
  AND sal <ANY
    (SELECT sal FROM sal_history s2
     WHERE s1.emp_seq = s2.emp_seq
     AND s1.effective_date = s2.effective_date)
``` can be transformed to

```
SELECT s1.* FROM sal_history s1,
  (SELECT emp_seq, effective_date, MAX(sal)
   col1 FROM sal_history s2
   GROUP BY emp_seq, effective_date) x
WHERE emp_seq = 1001
AND s1.sal < x.col1
AND s1.emp_seq = x.emp_seq
AND s1.effective_date = x.effective_date
```

41. The following correlated example illustrates the scalar operator, "=".

For example,

```
SELECT * FROM employees e
  WHERE hiredate =
    (SELECT MIN(effective_date) FROM sal_history s
     WHERE e.emp_seq = s.emp_seq)
``` can be transformed to

```
SELECT e.* FROM employees e,
  (SELECT emp_seq, MIN(effective_date)
   col1 FROM sal_history s
   GROUP BY emp_seq) x
WHERE hiredate = x.col1
AND e.emp_seq = x.emp_seq
```

42. The following correlated example illustrates the EXISTS operator where the subquery contains a HAVING clause but no GROUP BY or aggreagate. The point here is to add the GROUP BY clause before the HAVING clause.

For example,

```
SELECT * FROM employees e
WHERE EXISTS
    (SELECT null FROM sal_history s
     WHERE e.emp_seq = s.emp_seq
     HAVING COUNT(*) > 1)
``` can be transformed to

```
SELECT e.* FROM employees e,
    (SELECT emp_seq FROM sal_history s
     GROUP BY emp_seq
     HAVING COUNT(*) > 1) x
WHERE e.emp_seq = x.emp_seq
```

43. This correlated example is similar to the immediately preceding example 42 where there is a HAVING clause. However, in this example the GROUP exists as well.

For example,

```
SELECT * FROM employees e
WHERE EXISTS
    (SELECT null FROM sal_history s
     WHERE e.emp_seq = s.emp_seq
     GROUP BY effective_date
     HAVING COUNT(*) > 1)
``` can be transformed to

```
SELECT e.* FROM employees e,
    (SELECT DISTINCT emp_seq FROM sal_history s
     GROUP BY effective_date, emp_seq
     HAVING COUNT(*) > 1) x
WHERE e.emp_seq = x.emp_seq
```

44. The following non-correlated example illustrates when a subquery can not be moved for the EXISTS operator. The reason for this is that the solution is to add the "ROWNUM=1" criterion to the subquery. However, the HAVING clause can disqualify the only row retrieved. In this example there should be at least two rows qualifying else the subquery returns the empty set.

For example,

```
SELECT * FROM employees e
WHERE EXISTS
    (SELECT null FROM sal_history s
     HAVING COUNT(*) > 1)
``` would be INCORRECTLY transformed to

```
SELECT * FROM employees e,
    (SELECT null FROM sal_history s
     WHERE ROWNUM = 1
     HAVING COUNT(*) > 1)
```

45. The next correlated example illustrates subquery correlated to multiple levels above. This example is included because in the section above, "Restriction", indicates that one should not attempt to convert these type of correlated subqueries. The reason for this is that they are relatively complicated, though they are possible as will be shown below.

For example,

```
SELECT * FROM employees e
WHERE EXISTS
    (SELECT null FROM assignments a
     WHERE a.emp_seq = e.emp_seq
     AND EXISTS
         (SELECT null FROM time_sheets t
          WHERE t.emp_seq = e.emp_seq
          AND t.proj_seq = a.proj_seq))
``` can be transformed first to

```
SELECT e.* FROM employees e
WHERE EXISTS
    (SELECT null FROM assignments a,
        (SELECT DISTINCT emp_seq, proj_seq FROM
         time_sheets t) x1
     WHERE a.emp_seq = e.emp_seq
     AND x1.emp_seq = e.emp_seq
     AND x1.proj_seq = a.proj_seq)
``` and next transformed to

```
SELECT e.* FROM employees e,
    (SELECT DISTINCT a.emp_seq col1, x1.emp_seq col2 FROM
     assignments a,
        (SELECT DISTINCT emp_seq, proj_seq FROM
         time_sheets t) x1
     WHERE x1.proj_seq = a.proj_seq) x2
WHERE x2.col1 = e.emp_seq
AND x2.col2 = e.emp_seq
```

The first transformation is relatively simple. The subquery could not be merged, so it was moved. This required the DISTINCT keyword in the Select list, plus the local columns that were part of correlation criteria to be moved to the Select list. In addition, the correlated criteria were moved to the surrounding query.

The second transformation is a bit more complex because now there are two columns from different local tables of the subquery that had the same name but were correlated to the surrounding query. That means unique aliases had to be given to the columns when they were moved to the Select list. Then the system only had to move the correlated criteria to the surrounding query.

To better optimize this, the system should notice the transitivity of the criteria before the move. For example. we had "a.emp_seq=e.emp_seq" and also "x1.emp_seq=e.emp_seq". This is equivalent to saying "a.emp_seq=x1.emp_seq". Recognizing this would have made the join in the subquery more efficient and would have resulted in:

```
SELECT e.* FROM employees e,
    (SELECT DISTINCT a.emp_seq col1, x1.emp_seq col2 FROM
     assignments a,
        (SELECT DISTINCT emp_seq, proj_seq FROM
         time_sheets t) x1
```

```
        WHERE x1.proj_seq = a.proj_seq
        AND a.emp_seq = x1.emp_seq) x2
WHERE x2.col1 = e.emp_seq
AND x2.col2 = e.emp_seq
```

46. An OR operator is considered parent of a subquery. The following example illustrates where a conversion to a join will produce a wrong answer.

For example,

```
SELECT count(*) FROM employees
    WHERE hiredate > '01-jan-97'
    OR emp_seq IN (SELECT emp_seq FROM sal_history
            WHERE sal > 100)
```

If the OR is disregarded, the conversion will be to:

```
SELECT count(*)
FROM employees e, (SELECT DISTINCT emp_seq FROM sal_history
WHERE sal > 100) x
WHERE hiredate > '01-jan-97'
OR e.emp_seq = x.emp_seq
```

One way to see the problem is to now convert the OR to a UNION ALL, as follows:

```
SELECT count(*)
FROM employees e, (SELECT DISTINCT emp_seq FROM sal_history
WHERE sal > 100) x
WHERE hiredate > '01-jan-97'
    UNION ALL
SELECT count(*)
FROM employees e, (SELECT DISTINCT emp_seq FROM sal_history
WHERE sal > 100) x
WHERE hiredate > '01-jan-97'
```

47. The following example deals with OR'ed correlation criteria. If the correlation criteria are OR'ed the conversion to an outer-join is impossible, and the conversion to a NOT IN is complex.

For example,

```
SELECT * FROM employees e
    WHERE NOT EXISTS (SELECT * FROM sal_history s
        WHERE s.effective_date = e.birthdate
        OR s.effective_date = e.hiredate)
``` if the conversion to a NOT was performed, the system should do the following:

```
SELECT * FROM employees e
WHERE birthdate NOT IN (SELECT effective_date FROM
sal_history s)
OR hiredate NOT IN (SELECT effective_date FROM sal_history s)
``` if the conversion to an outer join is not impossible because it would produce un-parsable syntax:

```
SELECT e.* FROM employees e, (SELECT DISTINCT
effective_date FROM sal_history) x
WHERE e.birthdate = x.effective_date(+)
OR e.hiredate = x.effective_date(+)
```

48. The following example illustrates that a NOT IN to NOT EXISTS when original subquery can produce empty set. The subquery was artificially forced to produce an empty set for demonstration purposes.

For example,

```
SELECT * FROM employees
    WHERE hiredate NOT IN
        (SELECT effective_date FROM sal_history
            WHERE 1=2
``` should be transformed as follows to ensure the same result set is produced:

```
SELECT * FROM employees e
    WHERE NOT EXISTS
        (SELECT * FROM sal_history s
            WHERE 1=2
            AND e.hiredate = s.effective_date)
    AND (e.hiredate IS NOT NULL
        OR
        NOT EXISTS (SELECT * FROM sal_history
            WHERE 1=2)
```

However, a problem with this solution is that we are back to the original again.

49. The following correlated example illustrates a HAVING clause with an aggregate correlated to surrounding query.

For example,

```
SELECT * FROM projects p
    WHERE EXISTS
        (SELECT null FROM time_sheets t
            WHERE t.proj_seq = p.proj_seq
            GROUP BY emp_seq
            HAVING MIN(t.rpt_date) = p.start_date)
```

This transformation may require moving the aggregate and correlation columns to the SELECT list as follows:

```
SELECT * FROM projects p,
    (SELECT proj_seq, MIN(rpt_date) col1 FROM time_sheets
        GROUP BY emp_seq, proj_seq) x
    WHERE p.proj_seq = x.proj_seq
    AND p.start_date = x.col1
```

50. The following correlated example demonstrates a merge with NOT IN. Note that the added criterion in the transformation contains the ROWID of the subquery table that is interfaced to the surrounding query. It is important to use the ROWID of alias "t" rather than "a" because "t" is the lowest level child in the join order, "e" is outer-joined to "a" and then "a" is outer-joined to "t".

For example,

```
SELECT emp_seq FROM employees e
WHERE e.hiredate NOT IN
    (SELECT start_date FROM assignments a, time_sheets t
     WHERE e.emp_seq = a.emp_seq
     AND a.emp_seq = t.emp_seq
     AND a.proj_seq = t.proj_seq
     AND t.rpt_date = '01-jan-87'
     AND a.proj_seq = 1)
``` can be transformed to

```
SELECT e.emp_seq FROM employees e, assignments a, time_sheets t
WHERE e.hiredate = a.start_date(+)
AND e.emp_seq = a.emp_seq(+)
AND a.emp_seq = t.emp_seq(+)
AND a.proj_seq = t.proj_seq(+)
AND t.rpt_date(-) = '01-jan-87'
AND a.proj_seq(-) = 1
AND t.ROWID is null
```

51. The following correlated example is similar to the immediately preceding example 50, except that the interface column of the subquery is not the same as the correlated table in the subquery. For example START_DATE belongs to ASSIGNMENTS but T.EMP_SEQ is correlated but belongs to a different table. If transitivity is used we can switch T.EMP_ to A.EMP_SEQ because of the join criteria between T and A.

For example,

```
SELECT emp_seq FROM employees e
WHERE e.hiredate NOT IN
    (SELECT start_date FROM assignments a, time_sheets t
     WHERE e.emp_seq = t.emp_seq
     AND a.emp_seq = t.emp_seq
     AND a.proj_seq = t.proj_seq
     AND t.rpt_date = '01-jan-87'
     AND a.proj_seq = 1)
``` first add the transitivity to yield

```
SELECT emp_seq FROM employees e
WHERE e.hiredate NOT IN
    (SELECT start_date FROM assignments a, time_sheets t
     WHERE e.emp_seq = a.emp_seq
     AND a.emp_seq = t.emp_seq
     AND a.proj_seq = t.proj_seq
     AND t.rpt_date = '01-jan-87'
     AND a.proj_seq = 1)
``` we then have the same query as in the previous example 50, which means the same transformation occurs.

52. This correlated example is similar to example 50 except now the table in the subquery corresponding to the interface columns is TIME_SHEETS. The only difference is that EMPLOYEES is outer-joined to TIME_SHEETS and then TIME_SHEETS is outer-joined to ASSIGNMENTS. Therefore, the added criterion uses ROWID of the ASSIGNMENTS table rather than the TIME_SHEETS table as in example 50.

For example,

```
SELECT emp_seq FROM employees e
WHERE e.hiredate NOT IN
    (SELECT rpt_date FROM assignments a, time_sheets t
     WHERE e.emp_seq = t.emp_seq
     AND a.emp_seq = t.emp_seq
     AND a.proj_seq = t.proj_seq
     AND t.proj_seq = 1)
``` can be transformed to

```
SELECT e.emp_seq FROM employees e, assignments a, time_sheets t
WHERE e.hiredate = t.rpt_date(+)
AND e.emp_seq = t.emp_seq(+)
AND t.emp_seq = a.emp_seq(+)
AND t.proj_seq = a.proj_seq(+)
AND t.proj_seq(-) = 1
AND a.ROWID is null
```

53. The following correlated example illustrates that an aggregate of aggregate is not a possible translation.

For example,

```
SELECT * FROM projects p
WHERE stop_date IN
    (SELECT MAX(MIN(rpt_date)) FROM time_sheets t
     WHERE t.proj_seq = p.proj_seq
     GROUP BY emp_seq
     HAVING MIN(t.rpt_date) = p.start_date)
``` would have to translated INCORRECTLY to

```
SELECT * FROM projects p,
    (SELECT proj_seq, MIN(rpt_date) col1,
     MAX(MIN(rpt_date)) col2 FROM time_sheets t
     GROUP BY emp_seq, proj_seq) x
WHERE p.proj_seq = x.proj_seq
AND p.start_date = x.col1
AND p.stop_date = x.col2
```

However, such an SQL will not compile and should therefore be avoided.

54. The following correlated example illustrates that a non-equality correlation criterion and aggregate is not a possible translation.

For example,

```
SELECT * FROM assignments a
WHERE a.emp_seq IN
    (SELECT emp_seq FROM time_sheets t
     WHERE t.proj_seq = a.proj_seq
     AND a.start_date > t.rpt_date
     GROUP BY emp_seq
     HAVING MAX(rpt_date) < a.stop_date)
``` would be INCORRECTLY transformed to

```
SELECT * FROM assignments a,
    (SELECT emp_seq, proj_seq, rpt_date, MAX(rpt_date)
        col1 FROM time_sheets t
        WHERE t.proj_seq = a.proj_seq
        AND a.start_date > t.rpt_date
        GROUP BY emp_seq, proj_seq, rpt_date,) x
WHERE a.emp_seq = x.emp_seq
    AND a.proj_seq = x.proj_seq
    AND a.start_date > x.rpt_date
    AND a.stop_date > x.col1
```

The problem here is that because to the non-equality criterion "a.start_date>t.rpt_date", the T.RPT_DATE will have to be moved to the SELECT list as well as the GROUP BY. However, the aggregate can not also be moved to the SELECT list since it will contain the wrong group. In fact the MAX will now be equal to RPT_DATE.

55. The following correlated example also illustrates that an aggregate of aggregate is not possible transformation. For example,

```
SELECT * FROM assignments a
WHERE a.stop_date IN
    (SELECT MAX(MIN(rpt_date)) FROM time_sheets t
        WHERE t.proj_seq = a.proj_seq
        GROUP BY emp_seq)
``` would be INCORRECTLY transformed to

```
SELECT * FROM assignments a,
    (SELECT proj_seq, MAX(MIN(rpt_date))
        col1 FROM time_sheets t
        GROUP BY emp_seq, proj_seq) x
    WHERE a.stop_date = x.col1
    AND a.proj_seq = x.proj_seq
```

The problem is that you cannot have a scalar and an aggregate on the SELECT list.

Optimization

The following further lists the ways the present system uses to optimize an SQL statement by generating alternative SQL statements, after the optimization mode has been selected by system or user. The hint for the optimization goal should e included in each SQL statement transformation. The system will determine all transitivity's in the non-join criteria, determine all join orders and determine all the various subquery transformations.

Non-Join Transitivity's

Briefly, looking at the following query,

```
SELECT * FROM employees e, assignments a, time_sheets t
WHERE e.emp_seq = a.emp_seq
    AND a.emp_seq = t.emp_seq
    AND a.proj_seq = t.proj_seq
    AND e.emp_seq IN (SELECT emp_seq FROM dependents
                     WHERE relation = 'SPOUSE')
```

In this example, the criterion on the subquery of DEPENDENTS can be interfaced to "a.emp" or "t.emp_seq" just as well as the original which is "e.emp_seq". Other systems will not recognize this. By switching to "a.emp_seq" the present system allows the database to utilize the concatenated key index on ASSIGNMENTS.

An alternative transformation would be to change "e.emp_seq" to "a.emp_seq" (line 5) as follows:

```
1   SELECT * FROM employees e, assignments a, time_sheets t
2   WHERE e.emp_seq = a.emp_seq
3   AND a.emp_seq = t.emp_seq
4   AND a.proj_seq = t.proj_seq
5   AND a.emp_seq IN (SELECT emp_seq FROM dependents
6           WHERE relation = 'SPOUSE')
```

Since the operand, "e.emp_seq" can be replaces with two other values, the SQL can be written three ways (one for the original and two for the number of different values that can replace "e.emp_seq").

Multiple Non-Join Transitivities

The following describes how the system handles multiple non-join transitivities. For example, given the SQL statement,

```
1   SELECT * FROM employees e, assignments a, time_sheets t
2   WHERE e.emp_seq = a.emp_seq
3   AND a.emp_seq = t.emp_seq
4   AND a.proj_seq = t.proj_seq
5   AND a.proj_seq = (SELECT proj_seq FROM projects
6           WHERE name = 'EXPLAIN SQL: DEVELOPMENT')
7   AND e.emp_seq IN (SELECT emp_seq FROM dependents
8           WHERE relation = 'SPOUSE')
```

The two operands "a.proj_seq" (line 5) and "e.emp_seq" (line 7) in the two different non-join criteria can be replaced with equivalent columns. Other systems will not recognize this. However, the present system, by switching "e.emp-seq" (line 7) to "a.emp_seq" will allow the database to utilize the concatenated key index on ASSIGNMENT. The criterion with "e.emp_" is the same as the last example. The system can also replace "a.proj_seq" (line 5) with "t.proj_seq". This means that there are a potentially 6 (2×3) different SQL statements that can be used (note that this includes the original values).

Multi-Column Operands

What about operands that include multiple columns? For example:

```
1   SELECT * FROM employees e.sal_history s
2   WHERE e.emp_seq = s.emp_seq
3   AND (s.emp_seq, s.effective_date) IN
4       (SELECT emp_seq, max(effective_date)
5       FROM sal_history s1
6       WHERE effective_date <= SYSDATE
7       GROUP BY emp_seq)
```

The criterion "s.emp_seq.s.effective_date" (line 3) represents the non-join criterion where transitivity's can be applied. Since the join clause says "e.emp_seq" and "s.emp_seq" are equivalent, there are two options for the non-join criterion operand. The first is the original and the second is to replace "s.emp_seq" with "e.emp_seq".

The question is whether this should be done at all. The reason for the question is that both columns in the operand reference the same table, and there is a concatenated index on both columns. Even if there were only a single column indexes on both columns.

The answer is not to worry and just add the other columns to the operand, and add a corresponding column to the select list as follows:

```
SELECT * FROM employees e, sal_history s
WHERE e.emp_seq = s.emp_seq
AND "(e.emp_seq, s.emp_seq, s.effective_date) IN"
    (SELECT "emp_seq", emp_seq, max(effective_date)
     FROM sal_history s1
     WHERE effective_date <= SYSDATE
     GROUP BY emp_seq)
```

This simplifies the decision and set the database decide which to use.

OR'ed Non-Join Criteria

What if OR'ed criteria exist in the query? If a non-join criterion is OR'ed to any of the join criteria, the transitivities due to the OR'ed join criteria can not be used. The only transitivities that can be used are those that are AND'ed.

The following SQL illustrates a query with an OR, but notice that all of the join criteria are AND'ed to the non-join criterion.

```
SELECT * FROM employees e, assignments a, time_sheets t
WHERE e.emp_seq = a.emp_seq
AND a.emp_seq = t.emp_seq
AND a.proj_seq = t.proj_seq
AND (e.emp_seq IN (SELECT emp_seq FROM dependents
        WHERE relation = 'SPOUSE')
OR t.rpt_date = SYSDATE – 7)
```

The following SQL does not use parenthesis to specify the precedence of the criteria. The default, where ANDs are performed before ORs, is used.

```
1   SELECT * FROM employees e, assignments a, time_sheets t
2   WHERE e.emp_seq = a.emp_seq
3   OR e.emp_seq IN (SELECT emp_seq FROM dependents
4       WHERE relation = 'SPOUSE')
5   AND a.emp_seq = t.emp_seq
6   AND a.proj_seq = t.proj_seq
```

In this case the only join criteria that are AND'ed to the non-join criterion are in lines 5 and 6. The transitivity where "e.emp_seq=a.emp_seq" can not be used. And since none of the join criteria that are AND'ed to the non-join criteria reference "e.emp_seq", there are no transitive values.

Outer-Joins

What if a non-join criterion exists but there are outer-joins in the query? The next example illustrates:

```
SELECT * FROM employees e, assignments a, time_sheets t
WHERE e.emp_seq = a.emp_seq(+)
AND a.emp_seq = t.emp_seq(+)
AND a.proj_seq = t.proj_seq(+)
AND e.emp_seq IN (SELECT emp_seq FROM dependents
        WHERE relation = 'SPOUSE')
```

Since the non-join criterion in question has an operand on "e.emp_seq", and there are no join criteria where the equivalent column is from a non-outer-joined table, there are no transitive values.

The following example is slightly different from the previous.

```
SELECT * FROM employees e, assignments a, time_sheets t
WHERE e.emp_seq = a.emp_seq
AND a.emp_seq = t.emp_seq(+)
AND a.proj_seq = t.proj_seq(+)
AND e.emp_seq IN (SELECT emp_seq FROM dependents
        WHERE relation = 'SPOUSE')
```

In this example, TIME_SHEETS is the only outer-joined table. Therefore in this example, the transitivity "e.emp_seq=a.emp_seq" can be used but "e.emp_seq" can not be equated to "t.emp_seq".

Transitivity of Simple Non-Join Criteria

The following query will be used to explain this concept.

```
1   SELECT * FROM employees e, dependents d
2   WHERE e.emp_seq = d.emp_seq
3   AND "d.emp_seq = 1001"
```

The non-join criterion is "d.emp_seq =1001" (line 3). Due to the transitivity based on the join criterion, the query could be rewritten as:

```
SELECT * FROM employees e, dependents d
WHERE e.emp_seq = d.emp_seq
AND "e.emp_seq = 1001"
```

Now the non-join criterion is on the EMPLOYEES table.

This should be considered to be a single column operand with transitivity with two possible values.

Transitivity of Non-Join Criteria and Nested Selects

This is one area of single column transitivity that can be very beneficial. If the nested select does not have GROUP BY syntax or aggregates in the select list, and there is a non-join criterion in the main query that references one of the join columns, the non-join criterion could be moved to the nested select.

For instance, the non-join criterion is "e.emp_seq BETWEEN 1001 and 1010" (line 4).

```
1   SELECT * FROM employees e,
2       (SELECT DISTINCT emp_seq FROM dependents) x
3   WHERE e.emp_seq = x.emp_seq
4   AND "e.emp_seq BETWEEN 1001 and 1010"
```

Because of the join criterion and transitivity, the query can be rewritten as follows:

```
SELECT * FROM employees e,
    (SELECT DISTINCT emp_seq FROM dependents
        WHERE "emp_seq BETWEEN 1001 and 1010") x
WHERE e.emp_seq = x.emp_seq
AND e.emp_seq BETWEEN 1001 and 1010
```

The point is not to consider this to be a single column operand that can take on multiple values, but to simply duplicate the criterion in the nested select.

Driving Tables

There can be queries with non-join criteria that are not indexed. For example, there is no way for an index search to start the query. There dan be queries that do have indexed non-join criteria. And finally there can be queries with no non-join criteria. Another important consideration is whether the join criteria are indexed on both sides. All this must be considered along with what the optimization mode is.

Note the non-join criteria references below include those where on operand is a subquery.

Also note the potential driving tables should be determined for all subqueries with more than one table as well as the main query.

If Non-Join Criteria Exist

Determining a driving table is based on the optimization mode being used.

FIRST ROWS

If the optimization mode is set to FIRST ROWS, then for table/view or nested select in From clause (that is not an outer-joined table), count the number of indexed non-join criteria and non-indexed non-join criteria. If the table has any indexed non-join criteria, then the table can be used to drive the query. If none of the tables have indexed non-join criteria, then the potential driving tables are those with any non-indexed non-join criteria.

ALL ROWS

If the optimization mode is set to ALL ROWS, then for table/view or nested select in From clause (that is not an outer-joined table), just could the number of non-join criteria, whether indexed or not. The potential driving tables are those with any non-join criteria. (The count will be used later in determining the join order.)

The following SQL statement will be used to illustrate both optimization mode transformations.

```
SELECT * FROM employees e, dependents d, assignments a
WHERE e.emp_seq = d.emp_seq
AND e.emp_seq = a.emp_seq
AND lname like 'SM%'
AND fname = 'ED'
AND relation = 'SPOUSE'
```

For the above SQL, if the optimization mode is FIRST ROWS, EMPLOYEES can be a driving table because of the indexed no-join criteria on LNAME (we can forget about the fact that FNAME is part of the concatenated index). The non-join criterion on RELATION is not indexed so DEPENDENTS can not be a driving table. In addition, there are no non-join criteria on ASSIGNMENTS. Accordingly, the only potential driving table is EMPLOYEES.

For the above SQL, if the optimization mode is ALL ROWS, both EMPLOYEES and DEPENDENTS can be driving tables because they both have non-join criteria. Again, ASSIGNMENTS does not have any non-join criteria and thus can not be a driving table.

If No Non-Join Criteria

If there are absolutely non -join criteria, and we know the hierarchy either via referential integrity, or though the user join (where the side using the unique index is the parent side, and the side with the non-unique index is the child side), then the driving table should be the top-most parent. And that should be for both FIRST ROW and ALL ROWS optimization modes.

For example, assume there is no referential integrity in the following example:

```
SELECT * FROM employees e, dependents d, assignments a
WHERE e.emp_seq = d.emp_seq
AND e.emp_seq = a.emp_seq
```

The join between EMPLOYEES and DEPENDENTS uses a unique index on the EMPLOYEES side and a non-unique on the DEPENDENTS side. Accordingly, EMPLOYEES is considered the parent, and DEPENDENTS a child. The join between EMPLOYEES and ASSIGNMENTS uses the unique index on the EMPLOYEES side. However, there is no index at the ASSIGNMENTS site (there is an index including EMP_SEQ but not as the leading column.) The next section, "If Un-Indexed Join Criteria" will explain the significance of this.

Therefore for the example above, EMPLOYEES would be the only candidate for driving the query (though you'll see in the next section that ASSIGNMENTS, due to the lack of join index, may also be considered a potential drive.)

What about a query where more than one table can be considered the top-most table? The following SQL illustrates.

```
SELECT * FROM employees e, dept_history dh, departments d
WHERE e.emp_seq = dh.emp_seq
AND dh.dept_seq = d.dept_seq
```

In this case, both EMPLOYEES and DEPARTMENTS are parents of DPT_HISTORY. Accordingly, both can be tested as driving tables.

Un-Indexed Join Criteria

If a table's join is not indexed, then that table is a candidate for driving the query if the optimization mode is ALL ROWS. Note that the table can drive an ALL ROWS query even if the table doesn't have any non-join criteria whereas other tables do. If the optimization mode is FIRST ROWS, a table like this is not considered unless there are non-join criteria on the table. For example, use the previous rules of giving priority to tables with indexed criteria. The following example illustrates:

```
SELECT * FROM employees e, assignments a, projects p
WHERE a.proj_seq = p.proj_seq
AND e.emp_seq = a.emp_seq
```

ASSIGNMENTS in the above query does not have an index on the "a.proj_seq". Therefore ASSIGNMENTS is also a candidate for driving the query in ALL ROWS optimization mode.

Outer Joins

If a table is outer-joined, it should be used as a driving table. Accordingly, as illustrated in the following example, even though there is a non-join criterion on DEPENDENTS, DEPENDENTS still can not be used to drive the query.

```
SELECT * FROM employees e, dependents d
WHERE e.emp_seq = d.emp_seq(+)
AND d.relation(+) = 'SPOUSE'
```

FROM Clause Nested Selects

The following query will illustrate the problem with outer joins. Since the nested select acts as a subquery in a non-join criterion, the subquery should always be a driving table. In face, all nested SELECTS that are not outer-joined are joined first, whether or not they have non-join criteria.

In the following query, the best plan occurs when the subqueries are joined first, thereby driving the selection of the historical records more efficiently. This is discussed more in the ORDERED Hint section below.

```
SELECT e.emp_seq, e.lname, e.fname, s.sal, d.dept_seq, j.job_seq
FROM employees e, sal_history s, job_history j, dept_history d,
     (SELECT emp_seq, MAX(effective_date) col1 FROM sal_history
        GROUP BY emp_seq) x1,
     (SELECT emp_seq, MAX(effective_date) col1 FROM job_history
        GROUP BY emp_seq) x2,
     (SELECT emp_seq, MAX(effective_date) col1 FROM dept_history
        GROUP BY emp_seq) x3
WHERE e.emp_seq = s.emp_seq
AND e.emp_seq = j.emp_seq
AND e.emp_seq = d.emp_seq
AND s.emp_seq = x1.emp_seq
AND s.effective_date = x1.col1
AND j.emp_seq = x2.emp_seq
AND j.effective_date = x2.col1
AND d.emp_seq = x3.emp_seq
AND d.effective_date = x3.col1
```

Views

Ideally, the system should check the view definition itself for non-join criteria, as well as the query containing the view. If the view definition contains a view, you would not recursively check the views. One level is enough and often that will be all that is needed. Also keep in mind that the view may be a join of multiple tables.

To simplify the process, consider the view as a potential driving table.

Join Orders

Before deciding on the join order, the system needs to know where to start. For example, what are the potential driving tables/views or nested selects in the From clause. (See Driving Tables above.)

The ORDERED hint will be used to specify the join order.

First, for the SQL statement that we will specify the join order for, test it without an ORDERED hint. For example, this will be the first permutation (with no ORDERED hint) tested. The other permutations will be based on the various driving tables that were decided on. If a SQL statement has two tables that can drive the query, then there will be at least three permutations; the original and two using the ORDERED hint with the different driving tables.

Pick one of the driving tables. Looking at the hierarchy between the objects in the FROM clause, check which join route will encounter the "most" non-join criteria (where FIRST ROWS looks for indexed non-join criteria if they exist, otherwise non-indexed non-join criteria; and ALL ROWS looks for just the most non-join criteria, whether indexed or not.) After all the objects are joined with non-join criteria, the other joins do no matter, so do not create variation s of those tables.

The following examples will illustrate.

EXAMPLE 1 the example below is for ALL ROWS optimization mode.

```
SELECT e. * FROM employees e, time_sheets t, projects p,
    (SELECT emp_seq, MAX(effective_date) col1
     FROM sal_history s
     WHERE sal > 100
     GROUP BY emp_seq) x
WHERE e.emp_seq = t.emp_seq
AND t.proj_seq = p.proj_seq
AND p.name = 'PAFO'
AND t.emp_seq = x.emp_seq
AND t.rpt_date = x.col1
```

There is one non-join criterion on PROJECTS and one for the nested select. The hierarchy for this example is shown in FIG. 10.

Figure 10:
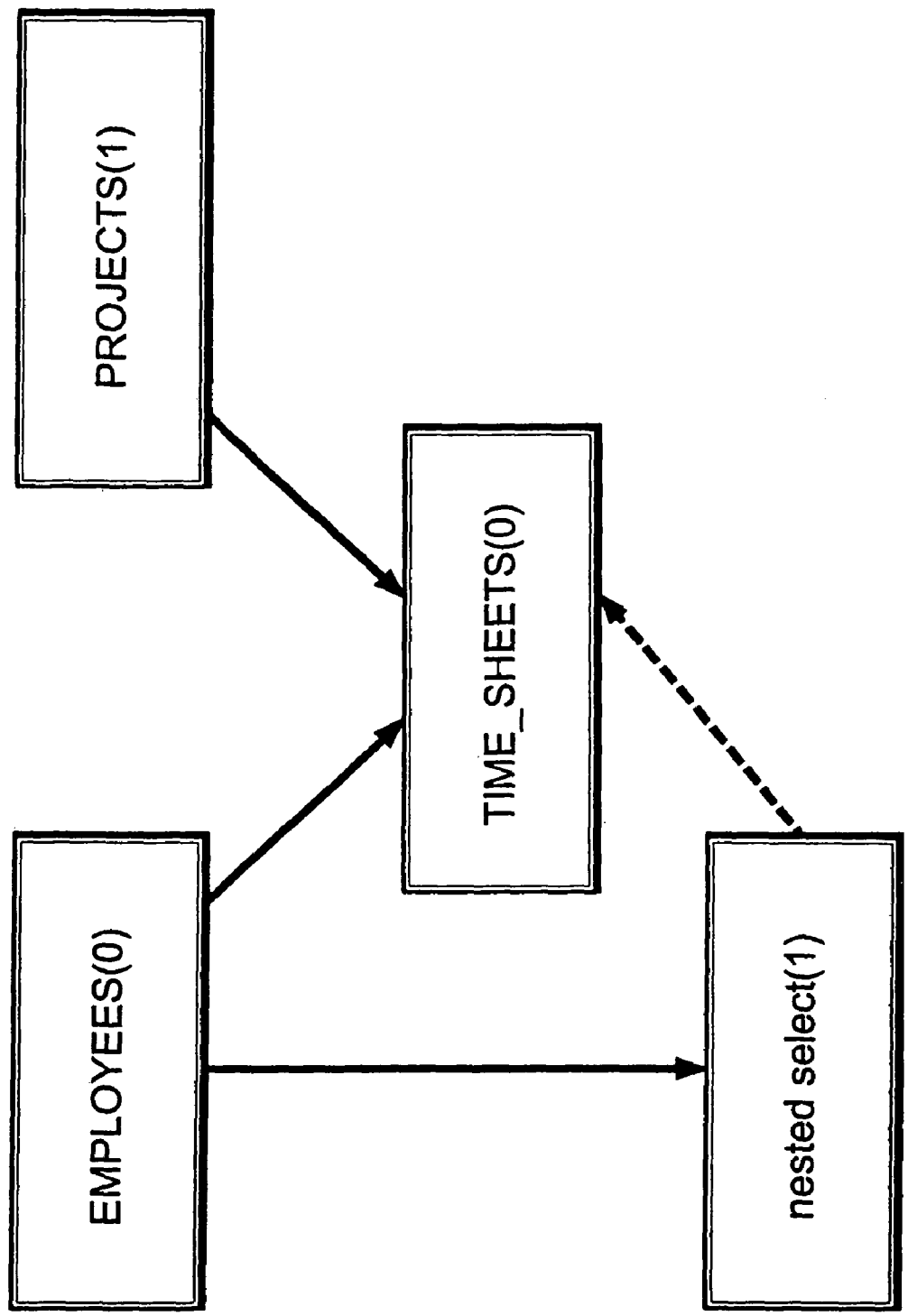
FIGS. 10-13 are charts showing hierarchies for tables in various SQL statements.

As shown in FIG. 10, the hierarchy depicts the nested select as a child of EMPLOYEES. This works in this case because we know that SAL_HISTORY is a child of EMPLOYEES. The dotted line shows that the relationship is via transitivity, as will be further described later below.

Because of the transitivity, if PROJECTS is picked as the driving table, we would want to join in the direction of the most non-join criteria. That means we want to get to the nested select as quickly as possible. Therefore the join should be:

PROJECTS→TIME_SHEETS→nested select→EMPLOYEES.

If the nested select is picked has the driver, the join should be:

nested select→TIME_SHEETS→PROJECTS→EMPLOYEES

It turns out that all the non-join criteria in the previous SQL were also indexed, so the same join orders would be used.

EXAMPLE 2

The following example if for FIRST ROW or ALL_ROWS optimization modes:

```
SELECT * FROM employees e,
    (SELECT DISTINCT emp_seq FROM dependents) x
WHERE e.emp_seq = x.emp_seq
AND e.emp_seq BETWEEN 1001 and 1010
```

The join criterion between EMPLOYEES and the nested select are indexed on both sides. However, since the non-join criterion should be duplicated in the nested select (recall the section above on transitivity), then both objects can drive the query.

EXAMPLE 3

This query is intended to be used for FIRST ROWS optimization mode.

This is the standard historical data query used. The point here is that the non-join criteria where on of the operands in each criterion is a subquery. Since the other operand in each case is indexed, these are considered indexed non-join criteria.

```
SELECT e.emp_seq, e.lname, e.fname, s.sal, d.dept_seq, j.job_seq
FROM employees e, sal_history s, job_history j, dept_history d
WHERE e.emp_seq = s.emp_seq
    AND e.emp_seq = j.emp_seq
    AND e.emp_seq = d.emp_seq
    AND s.effective_date =
        (SELECT MAX(effective_date) FROM sal_history s1
         WHERE s.emp_seq = s1.emp_seq
         AND effective_date <= SYSDATE)
    AND j.effective_date =
        (SELECT MAX(effective_date) FROM job_history j1
         WHERE j.emp_seq = j1.emp_seq
         AND effective_date <= SYSDATE)
    AND d.effective_date =
        (SELECT MAX(effective_date) FROM dept_history d1
         WHERE d.emp_seq = d1.emp_seq
         AND effective_date <= SYSDATE)
```

Figure 11:
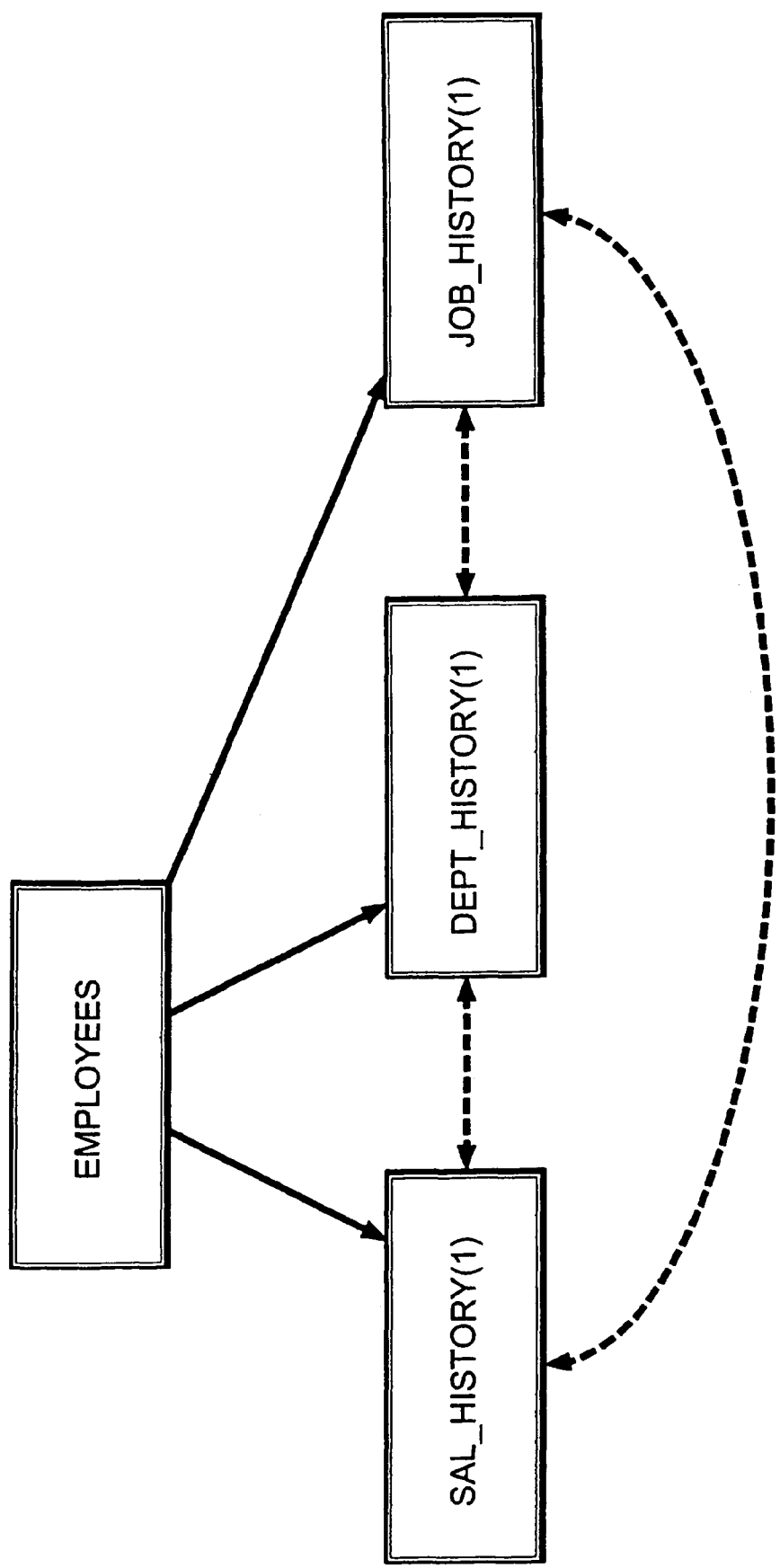

The hierarchy for this example is shown in FIG. 11. The dotted lines represent the transitive joins. Since each one of the history tables has an indexed non-join criterion, they can be joined directly. Therefore any of the history tables can be a driving table. The different join orders, besides the default, are as follows:

SAL_HISTORY→DEPT_HISTORY→JOB_HISTORY→
    EMPLOYEES
or
SAL_HISTORY→JOB_HISTORY→DEPT_HISTORY→
    EMPLOYEES
or
DEPT_HISTORY→SAL_HISTORY→JOB_HISTORY→
    EMPLOYEES
or
DEPT_HISTORY→JOB_HISTORY→DEPT_HISTORY→
    EMPLOYEES
or
JOB_HISTORY→DEPT_HISTORY→SAL_HISTORY→
    EMPLOYEES
or
JOB_HISTORY→SAL_HISTORY→DEPT_HISTORY→
    EMPLOYEES

EXAMPLE 4

Now, what if the subqueries in example 3 were moved to the FROM clause? Now the nested selects can possibly drive the query. It is assumed that this is an ALL ROWS optimization mode.

```
SELECT e.emp_seq, e.lname, e.fname, s.sal, d.dept_seq, j.job_seq
FROM employees e, sal_history s, job_history j, dept_history d,
    (SELECT emp_seq, MAX(effective_date) col1 FROM sal_history
     WHERE effective_date <= SYSDATE
     GROUP BY emp_seq) x1,
    (SELECT emp_seq, MAX(effective_date) col1 FROM job_history
     WHERE effective_date <= SYSDATE
     GROUP BY emp_seq) x2,
    (SELECT emp_seq, MAX(effective_date) col1 FROM dept_history
     WHERE effective_date <= SYSDATE
     GROUP BY emp_seq) x3
WHERE e.emp_seq = s.emp_seq
    AND e.emp_seq = j.emp_seq
    AND e.emp_seq = d.emp_seq
    AND s.emp_seq = x1.emp_seq
    AND s.effective_date = x1.col1
    AND j.emp_seq = x2.emp_seq
    AND j.effective_date = x2.col1
    AND d.emp_seq = x3.emp_seq
    AND d.effective_date = x3.col1
```

Figure 12:
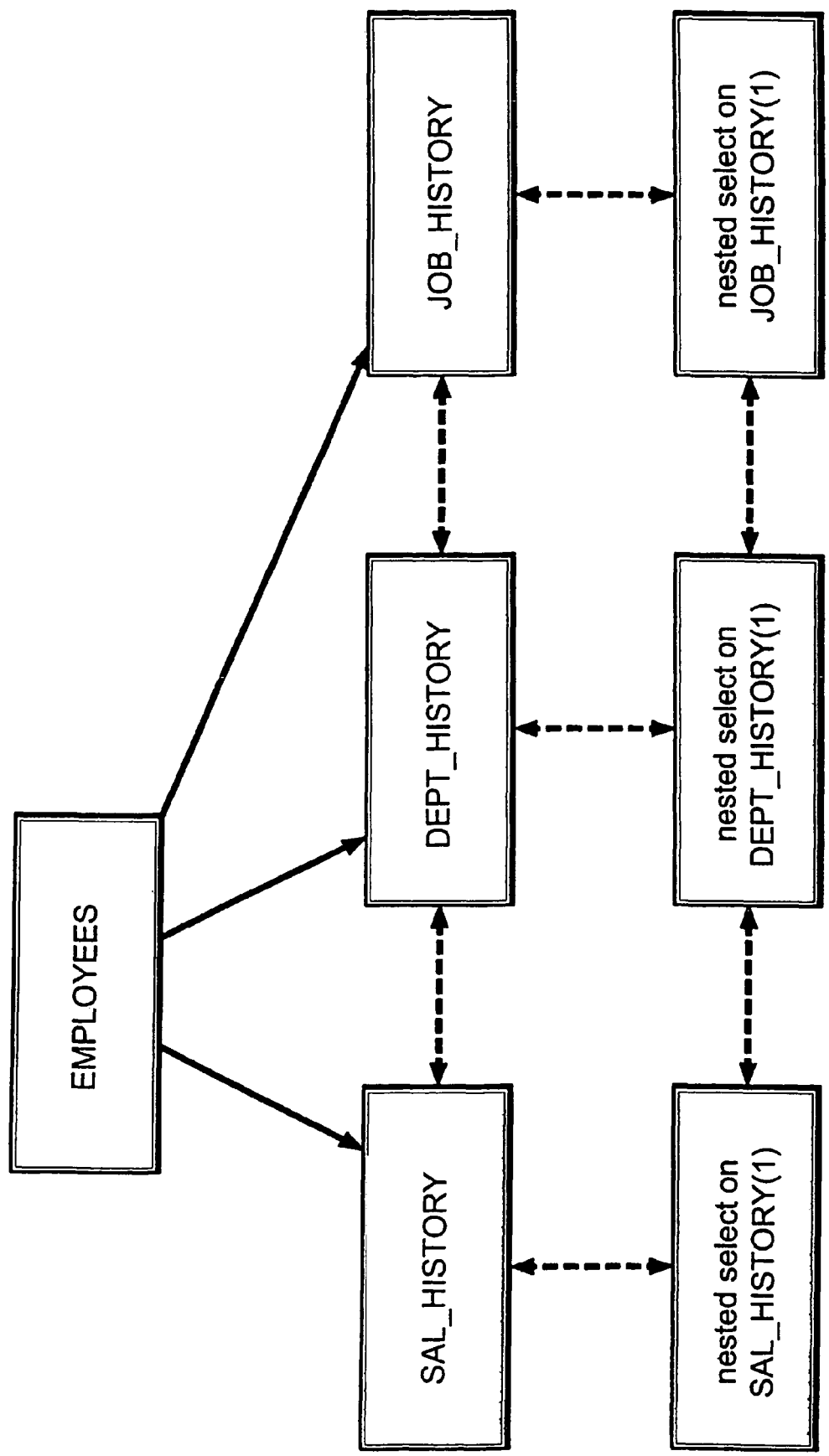

The hierarchy for this example is shown in FIG. 12. Note that there are transitive join criteria between the historical tables because of the transitivity of EMP_SEQ. For example, since "s.emp_seq=x1.emp_seq", and "s.emp_seq=e.emp_seq", and "e.emp_seq=j.emp_seq", and "j.emp_seq=x2.emp_seq", therefore "x1.emp_seq=x2.emp_seq".

In addition, note that there are no non-join criteria for the history tables, just the nested selects. So none of the history tables can drive the query. In any case as mentioned above with respect to the driving tables, the nested subqueries on the FROM clause can always be drivers.

Now we have even more possible join orders. To make it easier to view, aliases are given to the nested selects: S.N. for the nested select on SAL_HISTORY; DN for the nested select on DEPT_HISTORY: etc. In addition, as noted previously, the system does not care about re-arranging objects that have no non-join criteria.

S.N.→DN→JN→SAL_HISTORY→DEPT_HISTORY→
    JOB_HISTORY→EMPLOYEES
S.N.→JN→DN→SAL_HISTORY→DEPT_HISTORY→
    JOB_HISTORY→EMPLOYEES
DN→S.N.→JN→SAL_HISTORY→DEPT_HISTORY→
    JOB_HISTORY→EMPLOYEES
DN→JN→S.N.→SAL_HISTORY→DEPT_HISTORY→
    JOB_HISTORY→EMPLOYEES
JN→DN→S.N.→SAL_HISTORY→DEPT_HISTORY→
    JOB_HISTORY→EMPLOYEES
JN→S.N.→DN→SAL_HISTORY→DEPT_HISTORY→
    JOB_HISTORY→EMPLOYEES

Note again that the latter tables were constant i their order. The initial order could be changed, but it would always remain constant for the various join orders.

Clustered Tables

If a table is clustered to one of the other tables int eh query, those tables should be joined together without intermediate joins of other tables. For example, ASSIGNMENTS, PROJECTS and TIME_SHEETS are in the same hash cluster. The following query illustrates:

```
SELECT * FROM employees e, assignments a, projects p, time_sheets t
WHERE e.emp_seq = a.emp_seq
    AND a.emp_seq = t.emp_seq
    AND a.proj_seq = p.proj_seq
    AND a.proj_seq = t.proj_seq
    AND t.rpt_date BETWEEN '01-JAN-97' AND '30-JAN-97'
```

Figure 13:
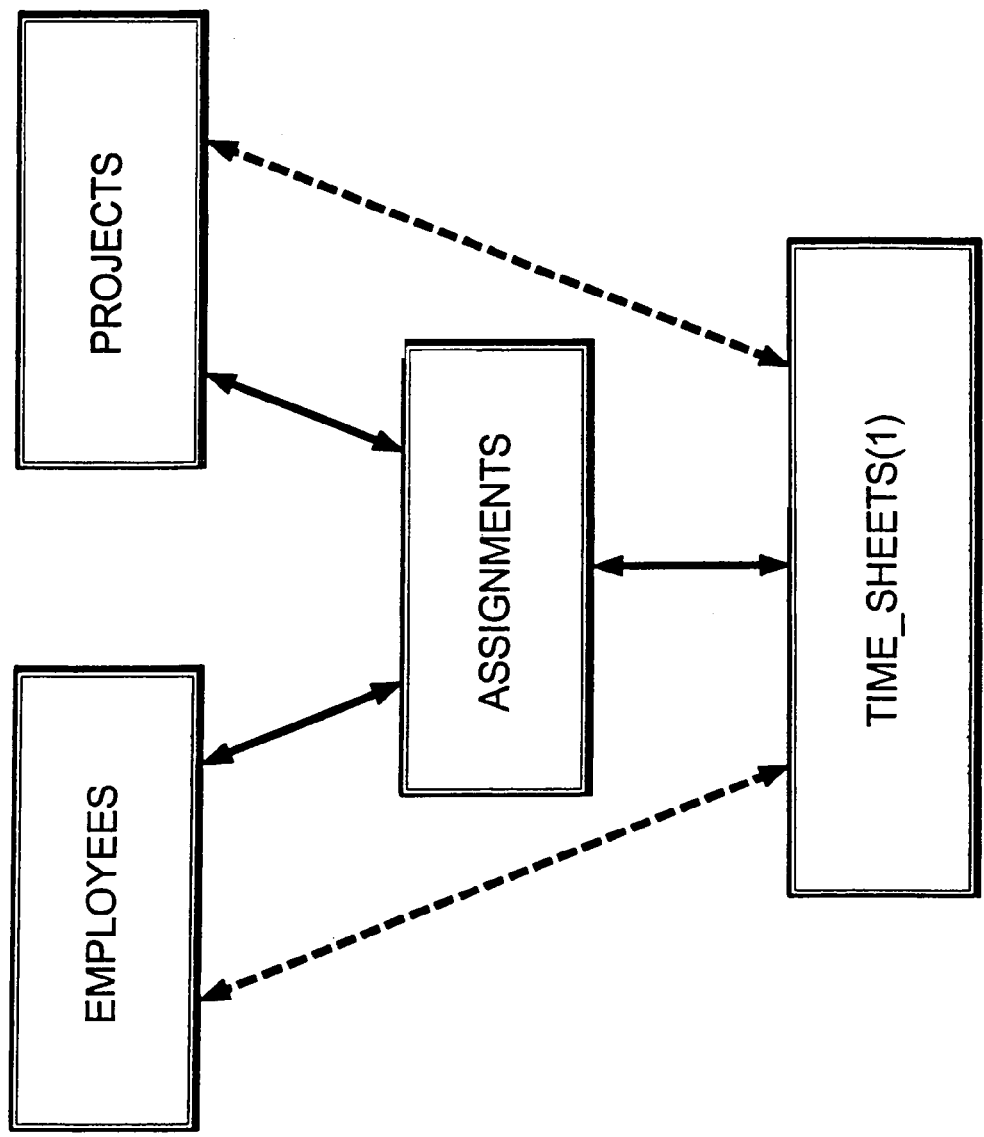

The hierarchy for this example is shown in FIG. 13. The transitive join relationships are shown in FIG. 13 by dotted lines. Only TIME_SHEETS has a non-join criterion. So TIME_SHEETS will be the only driver. Because of the clustering and lack of non-join criteria anywhere else, all clustered tables should be joined next as follows:

TIME_SHEETS→ASSIGNMENTS→PROJECTS→
    EMPLOYEES

ORDERED Hint

The ORDERED hint always works. However, the system will be more efficient if the join criteria allow for the order of the join. Often this means adding join criteria that corresponds to the transitivity in the current join criteria.

When picking the join order, the system must check if the explicit join criteria exists. If not then the system should check via transitivity where the join criterion is implied. If it is, implied join criterion exists, that criterion should be added to the query prior to testing. Since parameters are already imbedded within the ORDERED hint, the implied join criteria should continue to be embedded in the ORDERED hint. They system handles the join order in this was when allowing the user to manually use the ORDERED hint, since it is not desirable to modify the SQL text for the other optimization modes.

For the example below, although there is no explicit join criterion between tables X1 and X2, a join does exist via transitivity. The way to check is to follow the join paths from X1 to X2. For example, from X1 to S, the join is "x1.emp_seq=s.emp_seq AND x1.col1=s.effective_date". From S to E the join is over EMP_SEQ also. This implicitly provides "x1.emp_seq=e.emp_seq". Continuing to follow the join path to X2, goes from E to D also via EMP_SEQ. It could thus be said "x1.emp_seq=d.emp_seq". Finally the path goes from D to X2 via "d.emp_seq=x2.emp_seq AND d.effective_dtae=x2col1". Accordingly, the path is finally "x1emp_seq=x2.emp_seq". Since the ORDERED hint wants X1 joined to X2, and the implicit join criterion, "x1.emp_seq=x2emp_seq" exists, that criterion should be added as a parameter or ORDERED.

The same process can be performed to get the transitive join criterion between X2 and X3. For example. "x2.emp_seq = x3.emp_seq". Since X3 is not explicitly joined to E. the system Should include the join criterion "x3.emp_seq = e.emp_seq".

The suggested format of the ORDERED hint with implicit join criteria is as follows:

```
SELECT/*+ ORDERED(x1,x2,x3,e,s,j,d, "x1.emp_seq=x2.emp_seq",
"x2.emp_seq=x3.emp_seq",
"x3.emp_seq=e.emp_seq") */ e.emp_seq, e.lname, e.fname, s.sal,
d.dept_seq, j.job_seq
FROM employees e, sal_history s, job_history j, dept_history d,
     (SELECT emp_seq, MAX(effective_date) col1 FROM sal_history
      GROUP BY emp_seq) x1,
     (SELECT emp_seq, MAX(effective_date) col1 FROM job_history
      GROUP BY emp_seq) x2,
     (SELECT emp_seq, MAX(effective_date) col1 FROM dept_history
      GROUP BY emp_seq) x3
WHERE e.emp_seq = s.emp_seq
AND e.emp_seq = j.emp_seq
AND e.emp_seq = d.emp_seq
AND s.emp_seq = x1.emp_seq
AND s.effective_date = x1.col1
AND j.emp_seq = x2.emp_seq
AND j.effective_date = x2.col1
AND d.emp_seq = x3.emp_seq
AND d.effective_date = x3.col1
```

Nested Selects in FROM Clause

If a nested select is in the FROM clause and non-join criteria reference ti in the main SQL module, the system will check out moving that criteria to the WHERE clause of the nested SELECT. For example the SQL statement.

```
SELECT * FROM employees e, (SELECT DISTINCT emp_seq, relation
        FROM dependents d
        WHERE birthdate > '01-jan-80') x
WHERE e.emp_seq = x.emp_seq
AND x.relation = 'SPOUSE'
``` can be transformed to

```
SELECT * FROM employees e, (SELECT DISTINCT emp_seq, relation
        FROM dependents d
        WHERE birthdate > '01-jan-80'
        AND relation = 'SPOUSE') x
WHERE e.emp_seq = x.emp_seq
```

In this case, the non-join criterion is moved to the subquery to further reduce the number of rows qualified prior to filtering later after the join.

It should be noted that although some databases may already account for this, moving the criteria to the WHERE clasue would be instructive, plus allows hints to be specified easier.

NOT'ed Logic

NOT'ed criterion are generally not considered herein in terms of optimizing because it doesn't matter. That is, databases typically automatically handle the transposing of the NOT'ed criterion.

NYL Function

If the default parameter for the function does not equal the operand constant, then WHERE NVL(cost.0)=10 will evaluate to WHERE 0=10 when a NULL is returned. Accordingly, since the default (0) is not equal to 10, the NVL function can be dropped, thus allowing the criterion to use the index. If the criterion can not use an index do not do anything. If the column is not NULLable, then do no, since there is no reason for the NVL function at all.

WHERE NVL(cost.0)=0 should not be transposed unless other indexed criteria exist. For example, if this did occur, the system would have to transpose to WHERE cost=0 OR cost IS NULL. That would still require a full table scan without other indexed criterion. For example, look at the example below:

```
SELECT * FROM employees e, dependents d
WHERE e.emp_seq = d.emp_seq
AND e.hiredate = SYSDATE-7
AND NVL(d.birthdate, '01-JAN-80') = '01-JAN-80'
``` can be transformed to

```
SELECT * FROM employees e, dependents d
WHERE e.emp_seq = d.emp_seq
AND e.hiredate = SYSDATE-7
AND (d.birthdate = '01-JAN-80' OR d.birthdate IS NULL)
``` now, this can be further transformed to:

```
SELECT * FROM employees e, dependents d
WHERE e.emp_seq = d.emp_seq
AND e.hiredate = SYSDATE-7
AND d.birthdate = '01-JAN-80'
   UNION ALL
SELECT * FROM employees e. dependents d
WHERE e.emp_seq = d.emp_seq
AND e.hiredate = SYSDATE-7
AND d.birthdate IS NULL
```

It becomes more possible to optimize each SQL module (e.g., each nested query) separately. In addition, note that the transformation does not include the standard inequality in the bottom module. It does not have to, since the OR is with the same column. The OR'ed criterion will b e discussed in more detain below.

OR'ed Criteria

The following examples describe how the system handles OR'ed criteria.

For example, the SQL statement.
select * from tab where A=10 OR B=20
can be rewritten as

```
select * from tab where (A = 10)
UNION ALL
Select * from tab where (A != 10) AND (B = 20)
```

If columns A and B are nullable, then the approach would be:

```
select * from tab where (A = 10)
UNION ALL
select * from tab where (A != 10 OR A IS NULL) AND (B = 20)
```

A WHERE clause written such as.
where A=10 or (B=20 AND C=1)
can be rewritten as:

```
WHERE A = 10
UNION ALL
WHERE A != 10 AND ( B = 20 AND C = 1)
```

'IS NOT NULL' should be added if columns are nullable.

New Plan Operations

BITMAP KEY ITERATION

This occurs when a subquery outputs multiple values that then goes to bitmap index. Check if happens also when an IN, etc. Previously a BITMAP OR handled multiple values with IN operator on bitmap index.

Other Hints

In data warehousing, a star scheme can be used to depict one or more very large fact tables that contain the primary information in the data warehouse and a number of much smaller dimension tables (e.g., lookup tables), each of which contains information about the entries for a particular attribute in the fact table.

A star query is a join between a fact table and a number of lookup tables. Each lookup table is joined to the fact table using a primary-key to foreign-key join. However, the lookup tables are not joined to each other.

The star transformation is a cost-based query transformation aimed at executing star queries efficiently. While a star optimization may work well for schemes with a small number of dimensions and dense fact tables, the star transformations may be considered as an alternative if any of the following is true. For example, star transformations may be useful if the number of dimensions is large or if the fact table is sparse. In addition, the star transformations may be useful if there are queries where not all dimension tables have constraining predicates. The star transformation does not rely on computing a Cartesian produce to the dimension tables, which makes ti better suited for cases were fact table sparsity and/or large number of dimensions would lead to a large Cartesian product with few rows having actual matches in the fact table. In addition, rather than relying on concatenated indexes, the star transformation is based on combining bitmap indexes on individual fact table columns. There is no need to create many concatenated indexes where the different column orders match different patterns of constrained dimensions in different queries.

"STAR_TRANSFORMATION"—makes the present system use the best plan in which transformation was used. This occurs when there are bitmap indexes in the fact table and there are sufficient criteria on the dimension tables.

Star transformation is not supported for tables with certain characteristics. For example, tables with the following characteristics are not supported. Tables with the table hint that is incompatible with a bitmap access path, tables with too few bitmap indexes (there should be a bitmap index on a fact table column for the optimizer to consider generating a subquery for it), remote tables (however, remote dimension tables are allowed in the subqueries that are generated), anti-joined tables, tables that are already used as a dimension table in a subquery, tables that are really unmerged views, which are not view partitions, tables that have a good single-table access path and tables that are too small for the transformation to be worthwhile.

The following example illustrates reducing the result of a nested select early in the query. For example, if the user entered the query below with the nested select in the FROM clause.

```
SELECT e.* FROM employees e, time_sheets t, projects p,
        (SELECT emp_seq, MAX(effective_date) col1
         FROM sal_history s
         GROUP BY emp_seq) x
WHERE e.emp_seq = t.emp_seq
AND t.proj_seq = p.proj_seq
AND p.name = 'PAFO'
AND t.emp_seq = x.emp_seq
AND t.rpt_date = x.col1
"AND x.col1 < SYSDATE"
```

The user should have put the criterion with the nested select as shown below. That way, the result of the nested select can be reduced early.

```
SELECT e.* FROM employees e, time_sheets t, projects p,
        (SELECT emp_seq, MAX(effective_date) col1
         FROM sal_history s
         GROUP BY emp_seq
         "HAVING MAX(effective_date) < SYSDATE") x
WHERE e.emp_seq = t.emp_seq
AND t.proj_seq = p.proj_seq
AND p.name = 'PAFO'
AND t.emp_seq = x.emp_seq
AND t.rpt_date = x.col1
```

OBJECT_INSTANCE

If a table is not accessed during optimization, the system will be unable to discern which tables are in the SQL statement. For example, in the following SQL statement, both ASSIGNMENTS and PROJECTS are only represented in the ALL ROWS mode by their index accesses. That is, the table does not need to be accessed. Accordingly, if a user clicks on the index operation for ASSIGNMENTS nothing in the SQL would be highlighted to identify the relationship between the plan and the SQL.

```
SELECT * FROM employees e,
      (SELECT DISTINCT emp_seq FROM assignments a, projects p
      WHERE a.proj_seq = p.proj_seq) x
WHERE e.emp_seq = x.emp_seq
```

The system should at least check if the table is unique in the entire SQL statement. If it is, then the system should highlight the table when the user clicks on the index operation.
OBJECT INSTANCE When there is a nested select in the FROM clause, the present system does not account for the OBJECT_INSTANCE value given to the nested select as well as the OBJECT_INSTANCE values given to the objects inside the nested select.
Alternate SQL If a user wanted a FIRST ROWS mode it does not make sense in general to move a subquery to the FROM clause. A merge is always good, but not necessarily for a move. Check the example of historical data query for example. In fact, it might make sense to leave the correlated subqueries, or even convert non-correlated to correlated.

When an ORDERED hint is added that requests a join order other than what the original SQL specified, the system re-arranges the FROM clause and passes that to the database. However, when the system re-arranges, it still shows the original ORDERED hint with the parameters. Since the parameters are not part of the actual hint syntax, the system drops the parameters for the ORDERED hint when displaying the HINTS mode for the SQL. For example, if the original SQL in the EDIT window is:

```
SELECT/*-HINT1 ORDERED(s,d,e,j) */ *
FROM employees e, sal_history s, job_history j, dept_history d
WHERE e.emp_seq = s.emp_seq
AND e.emp_seq = j.emp_seq
AND e.emp_seq = d.emp_seq
AND s.sal > 500
AND j.job_seq = 10
AND d.effective_date = j.effective_date
AND s.effective_date = j.effective_date
the HINTS 1 window should display:
SELECT /*+ ORDERED */ *
FROM sal_history s , dept_history d , employees e , job_history j
WHERE e.emp_seq = s.emp_seq
AND e.emp_seq = j.emp_seq
AND e.emp_seq = d.emp_seq
AND s.sal > 500
AND j.job_seq = 10
AND d.effective_date = j.effective_date
AND s.effective_date = j.effective_date
```

This would be consistent with the disappearance of the keywork HINTS1, plus the FROM clause change. That is, the SQL window for a specific mode should display exactly what would be passed to the database. This should be done when join criteria is added to the ORDERED hint.
Reports A useful report would be one that recommends which "indexed columns (single column index)" might benefit from creating a histogram. Since a histogram should only be constructed on columns that do not have a normal distribution, we need to find the columns that do not have normal distribution.
"HINTS": For ALL ROWS, when the "joined to table" index is larger than the table, make FULL.
SQL Check If a subquery is interfaced with the relational operator, NOT IN, or any form of ALL, the system can display the following message and highlight, if possible, the subquery:

"If the subquery returns no row (empty set), the criterion including the subquery will evaluate to TRUE, i.e. it functions exactly the same as the NOT EXISTS when the subquery doesn't return a row."
Alternate SQL When a subquery returns columns that will feed into criterion referencing the same table, the select list of the subquery should be changed to contain the ROWID instead. For example, look at the historical query below.

```
SELECT * FROM employees e, sal_history s1
WHERE e.emp_seq = s1.emp_seq
AND s1.effective_date =
      (SELECT max(effective_date) FROM sal_history s2
      WHERE e.emp_seq = s2.emp_seq
      AND s2.effective_date <= SYSDATE)
``` could be transformed to

```
SELECT * FROM employees e, sal_history s1
WHERE e.emp_seq = s1.emp_seq
AND s1."ROWID" =
      (SELECT "ROWID" FROM sal_history s2
      WHERE e.emp_seq = s.emp_seq
      AND s2.effective_date <= SYSDATE)
```

Hints

When hints are applied, the user has to work at seeing if the hints took affect. The present system can provide feedback to inform the user that the hints did have the desired affect. For example, the system may inform the user whether the ORDERED hint joined in the specified order.

For queries including NOT IN or NOT EXISTS subquery, transitivity can be applied so the interface columns in the surrounding query belong to the same table. This merges NOT IN and NOT EXISTS subqueries because a table cannot outer-join to more than one table.

For example the following SQL statement,

```
SELECT *
FROM employees e, assignments a
WHERE e.emp_seq = a.emp_seq
AND (e.emp_seq, a.start_date) NOT IN (SELECT emp_seq, rpt_date
                                      FROM time_sheets)
``` can be converted to

```
SELECT *
FROM employees e, assignments a
WHERE e.emp_seq = a.emp_seq
AND (a.emp_seq, a.start_date) NOT IN (SELECT emp_seq, rpt_date
                                      FROM time_sheets)
``` which can then be converted to

```
        SELECT e.*. a.*
          FROM employees e, assignments a, time_sheets t1
          WHERE e.emp_seq = a.emp_seq
            AND a.emp_seq = t1.emp_seq (+)
            AND a.start_date = t1.rpt_date (+)
            AND t1.ROWID IS NULL
```

The following example illustrates merging NOT IN and NOT EXISTS subqueries to join. For example, the SQL statement.

```
        SELECT *
        FROM employees e
        WHERE NOT EXISTS
          (SELECT *
           FROM assignments a
           WHERE e.emp_seq = a.emp_seq )
``` will be converted to

```
        SELECT /*- ALL_ROWS */ e. *
        FROM employees e ,
          (SELECT DISTINCT 1 col2 , a.emp_seq col1
           FROM assignments a )
          t1
        WHERE e.emp_seq = t1.col1 (+ )
          AND t1.col2 IS NULL
``` however, the subquery should be merged as follows

```
        SELECT e. *
          FROM employees e , assignments a
          WHERE e.emp_seq = a.emp_seq (+ )
            AND a.emp_seq IS NULL
```

The system can convert SQL 4 to SQL 5 and then to SQL 6, as follows, by moving the constant in the surrounding interface column to the subquery.
For example, original SQL statement,

SQL 4

```
SELECT *
 FROM employees e, assignments a
 WHERE e.emp_seq = a.emp_seq
   AND (e.emp_seq, '22-FEB-94') NOT IN (SELECT emp_seq, rpt_date
                                         FROM time_sheets)
``` can be transformed to

SQL 5

```
        SELECT *
         FROM employees e, assignments a
         WHERE e.emp_seq = a.emp_seq
           AND e.emp_seq NOT IN (SELECT emp_seq
                                  FROM time_sheets
                                  WHERE rpt_date = '22-FEB-94')
``` which can be transformed to

SQL 6

```
        SELECT e.*,a.*
         FROM employees e, assignments a, time_sheets t1
         WHERE e.emp_seq = a.emp_seq
           AND a.emp_seq = t1.emp_seq (+)
           AND t1.rpt_date (+) = '22-FEB-94'
           AND t1.ROWID IS NULL
```

The following query cannot be converted because the subquery table has to outer-join to a table if merged. The subquery cannot be outer-joined to a constant alone.

SQL 7

```
SELECT *
 FROM employees e, assignments a
 WHERE e.emp_seq = a.emp_seq
   AND '22-FEB-94' NOT IN (SELECT rpt_date
                            FROM time_sheets)
```

If a subquery interface column is a constant, merge can be performed if all tables are unique when joined. When merging the subquery, the constant Θ is set to NOT EQUALS to the corresponding surrounding interface column and ORed with '<child>.ROWID IS NULL'
For example, the SQL statement,

SQL 8

```
SELECT *
 FROM employees e
 WHERE (e.emp_seq, lname) NOT IN (SELECT emp_seq, 'SMITH'
                                   FROM time_sheets
                                   WHERE proj_seq = 1
                                   AND rpt_date = '22-feb-94')
``` can be transformed to

SQL 9

```
        SELECT e.*
          FROM employees e, time_sheets t1
          WHERE e.emp_seq = t1.emp_seq (+)
            AND proj_seq (+) = 1
            AND rpt_date (+) = '22-feb-94'
            AND (t1.ROWID IS NULL
            OR lname <> 'SMITH')
```

Care must be exercised when attempting to transform SQL statements. For example, an attempt can be made to transform the following SQL statement

```
SELECT *
 FROM employees e
 WHERE emp_seq NOT IN (SELECT a.emp_seq
                        FROM projects p, assignments a
                        WHERE a.proj_seq = p.proj_seq
                        AND p.name = 'EXPLAIN SQL: DEVELOPMENT')
ORDER BY 1
``` into the following

```
                    SELECT/*+ ALL_ROWS */
                    e.*
                      FROM employees e, projects p, assignments a
                      WHERE e.emp_seq = a.emp_seq (+)
                        AND a.proj_seq = p.proj_seq (+)
                        AND p.name (+) = 'EXPLAIN SQL: DEVELOPMENT'
                        AND p.ROWID IS NULL
                      ORDER BY 1
```

However, this would not be correct, since it is not possible to merge the original SQL here to the outer query. This would result in an incorrect transformation.

Another problem may occur if the system attempts to add the 'ROWID IS NULL' clause with an arbitrary table. For example, sometimes the system might pick the projects table and sometimes it might pick the assignment table, depending on the order in the FROM clause. This would be incorrect. Care should be exercised to make certain that the lowest level child table is null (e.g., the projects table). Otherwise, the join criteria to the child table (projects in this case), will not be relevant.

The following rules and guidelines should be followed during transformation.

A) The present system should convert only if
  i) All intermediate tables in the join order should be joined to guarantee uniqueness.
  ii) There can be more than 1 branch. However, at most 1 lowest level child table can be non-unique. All other tables should be unique when joined in order. In other words, when checking the above SQL, the assignments table is the table with the interfaced subquery column. Since it is not a lowest level child (projects table is joined to it), its columns in the select list or in the where clause join with a constant with an =operator must form a unique key. However, emp_seq is not a unique column. SO this subquery cannot be merged. However, the Example SQL 10 below can be converted, when project name is a unique column.
  iii) If one of the subquery interface columns is a constant, all tables should be joined to guarantee uniqueness.
  iv) There is no aggregate function (GROUP BY, DISTINCT and HAVING is okay as long as there is no aggregate. When merged, ignore GROUP BY and DISTINCT and move HAVING criteria to WHERE clause)
  v) There is no CONNECT BY syntax
  vi) There is no set operation (e.g. UNION, MINUS)
  vii) Subquery contains no outer join.
B) For each lower level child, add '<child>.ROWID IS NULL' and OR them together.
C) If there is a constant in the surrounding interface column and there are other interface columns, change it to an equality criteria to the subquery where clause.
D) If there is a constant in a constant in the subquery interface column, set the constant to NOT EQUALS to the corresponding surrounding interface column and OR it with '<child>.ROWID IS NULL'

```
                                SQL 10
                    SELECT *
                      FROM status_list
                      WHERE status NOT IN (SELECT p.status
                          FROM projects p, assignments a
                          WHERE a.proj_seq = p.proj_seq
                            AND p.name = 'EXPLAIN SQL: DEVELOPMENT')
```

Correlated subqueries may present a problem when determining whether or not an outer-join can occur. Specifically, when the NOT IN operator is interfacing the correlated subquery, the interface columns int eh surrounding query must belong to the same table as the table correlated to the subquery. For example, see the SQL statements immediately below. The interface columns in the subquery should belong to the same table as the table correlated to the subquery. In the example below, the HIREDATE column belongs to "e", as well as one of the correlation criteria, but the other correlation criterion references "a.". So the merge is not possible.

```
                                SQL 11
                    SELECT * FROM time_sheets t
                      WHERE t.rpt_date NOT IN
                          (SELECT hiredate FROM employees e, assignments a
                            WHERE a.proj_seq = t.proj_seq
                              AND e.emp_seq = a.emp_seq
                              AND e.emp_seq = t.emp_seq)
```

It is necessary that "the interface columns in the[NOT IN] subquery must belong to the same table as the table correlated to the subquery", as long as rules/guidelines a) i) and a) ii) above are true. However, the corresponding interface columns in the surrounding query should belong to the same table because of the outer join. If converted, the assignment table needs to outer join to both time_sheets and employees. This is not legal. However, transitivity can be applied to convert the SQL 11 statement shown above to SQL 12 shown below. Then SQL 12 can be merged to SQL 13 as shown below. The merge is possible because both employees and assignments have unique indexes on the interface column(s).

```
                    SELECT * FROM time_sheets t
                      WHERE t.rpt_date NOT IN
                          (SELECT hiredate FROM employees e, assignments a
                            WHERE a.proj_seq = t.proj_seq
                              AND t.emp_seq = a.emp_seq
                              AND e.emp_seq = t.emp_seq)
                                SQL 12
                    SELECT * FROM time_sheets t, employees e, assignments a
                      WHERE e.hiredate(+) = t.rpt_date
                        AND a.proj_seq(+) = t.proj_seq
                        AND a.emp_seq(+) = t.emp_seq
                        AND e.emp_seq(+) = t.emp_seq
                        AND (a.rowid IS NULL or e.rowid IS NULL)
                                SQL 13
```

It should also be noted that you can not merge NOT EXISTS OR NOT IN subquery with non-column (constant, function, etc.) in the subquery select clause. For example, an attempt may be made to transform the following SQL 14 to SQL 15. However, SQL 15 does not produce the same result set as SQL 14 because of t.rpt_date='22-FEB-94'. The criteria could be changed to t.rpt_date<> '22-FEB-94'. However, we would have to guarantee the original subquery returns at least 1 row. This defeats the purpose of the transformation, because we have to keep the subquery.

```
SELECT *
    FROM time_sheets t
    WHERE (t.emp_seq, t.rpt_date) NOT IN (SELECT emp_seq,
        '22-FEB-94' FROM employees)
            SQL 14
```

```
SELECT/*- ALL_ROWS */
    t.*
    FROM time_sheets t, employees t1
    WHERE t.emp_seq = t1.emp_seq (+)
    AND t.rpt_date = '22-FEB-94'
    AND t1.ROWID IS NULL
        SQL 15
```

Set_NOT_IN_NOT_EXISTS_Subquery_Can_Be_Query

If an operator is NOT IN or NOT EXISTS, the following routine can be called attempt to determine whether it should attempt to convert the sub-query to a join.

```
<<code begin>>
IF subquery contains aggregate in Select list OR subquery contains aggregate in
HAVING clause OR subquery contains Connect By syntax OR subquery contains set
operation THEN RETURN FALSE
LOOP over each table X in the FROM list, if there is more than 1 join criterion, apply
transitivity so the table join to the same table, if possible.
Initialize Unique_list to empty
Non_Unqiue_table := null
LOOP over each TABLE in the FROM list containing interface columns
    IF CheckTableUniqueIndexCols return TRUE
        (CheckTableUniqueIndexCols routine checks for a given table, whether all
        the columns of its any one unique indexes are present in the where clause
        and have a '=' operation and the other operand is a constant or a
        correlated.)
    THEN add TABLE to the Unique_list
    ELSE
        IF Non_Unqiue_table is null
        THEN
            Non_Unqiue_table = TABLE
        ELSE
            RETURN FALSE
END LOOP over each TABLE in the FROM list containing interface columns
LOOP over each TABLE in the FROM list containing interface columns
    IF Check_Unique(TABLE, interface table of the surrounding query, Unique_list,
        Non_Unique_table) returns FALSE
        RETURN FALSE
END LOOP over each table in the FROM list containing interface columns
(Make sure all table is joined)
LOOP over each TABLE
    IF TABLE not in unique_list and TABLE <> Non_unique_table
    THEN
        RETURN FALSE
END LOOP over each TABLE
RETURN TRUE
<<code end>>
Check_Unique
Input:
TABLE
PARENT_TABLE
NONUNIQUE_TABLE
<<code begin>>
LOOP over each table Y joined to TABLE
    IF Y = PARENT_TABLE
        continue loop
    IF Y is in Unique_list or Y is Non_unique_table (if Y is already joined, cannot
    join to another table)
    THEN RETURN FALSE
    LOOP over each index of Y
        IF all indexed columns are joined to X with = operator OR index columns
= constant
        THEN
            add Y to Unique_list
            IF Check_Unique (Y, X, Unique_list, Non_unique_table) returns
FALSE
            THEN RETURN FALSE
            BREAK    (unique index found, no need to search anymore)
    END LOOP over each index of Y
    IF Y not in Unique_list
        IF Non_unique_table is null
            Non_unique_table = Y
            (Since Y is not unique, make sure no other table is joined to Y)
            LOOP over each table Z joined to Y
                IF Z not in Unique_list and Z <> Non_unique_table
```

```
            THEN RETURN FALSE
        END LOOP over each table Z joined to Y
    ELSE
        RETURN FALSE
    END LOOP over each table Y joined to TABLE
    RETURN TRUE
<<code end>>
```

If a WHERE clause criteria only references table in the nested select in the FROM clause, move it to the nested select.

For example, the following SQL

```
SELECT *
    FROM employees e,
        (SELECT DISTINCT emp_seq, relation
            FROM dependents d
            WHERE birthdate > '01-jan-80') x
    WHERE e.emp_seq = x.emp_seq
    AND x.relation = 'SPOUSE'
can be converted to
SELECT *
    FROM employees e,
        (SELECT DISTINCT emp_seq, relation
            FROM dependents d
            WHERE birthdate > '01-jan-80'
            AND x.relation = 'SPOUSE') x
    WHERE e.emp_seq = x.emp_seq
```

If a HAVING clause criteria does not involve group function, it can be moved to the WHERE clause.

For example, the following SQL statement

```
SELECT LNAME , count (*)
    FROM employees
    GROUP BY LNAME
    HAVING LNAME < 'D'
``` can be transformed to

```
SELECT LNAME , count (*)
    FROM employees
    WHERE LNAME < 'D'
    GROUP BY LNAME
```

The present disclosure may be conveniently implemented using one or more conventional general purpose digital computer and/or servers programmed according to the teachings of the present specification. Appropriate software coding can readily be prepared based on the teachings of the present disclosure.

In addition, although the above-description refers to specific database systems (e.g., Oracle), it should be understood that the present disclosure is not limited to any particular database or type of database system.

Numerous additional modifications and variations of the present disclosure are possible in view of the above-teachings. It is therefore to be understood that within the scope of the appended claims, the present disclosure may be practiced may be practiced other than as specifically described herein.

What is claimed is:

1. A method of tuning a database query, comprising:
    allowing a user to select a query of a database;
    parsing the selected database query to determine that the database query includes a first operator;
    selecting an optimization mode from a plurality of available optimization modes, wherein:
        a first optimization mode is automatically selected if one or more statistics exist for a table identified by the database query, and
        a second optimization mode is selected if one or more statistics do not exist for the table identified by the database query;
    tuning automatically the selected database query based on the structure of the database and the selected optimization mode; and
    displaying the tuned database query, and
    wherein automatically tuning the selected database query comprises automatically rewriting the selected database query by converting the first operator to a second operator.

2. The method as recited in claim 1,
    wherein the parsing determines tokens within the database query, tokens being words separated by delimiters.

3. The method as recited in claim 1, wherein the plurality of available optimization modes include Cost based and Rule based modes.

4. The method as recited in claim 3, wherein the Cost based modes include First_Rows mode and All_Rows mode.

5. The method as recited in claim 1, further comprising determining a cost associated with using the tuned database query.

6. The method as recited in claim 5, further comprising comparing a cost associated with using the selected database query to the cost associated with using the tuned database query.

7. The method as recited in claim 1, further comprising parsing the selected database query to determine whether the database query includes at least one subquery joined by at least one of a NOT EXISTS, a NOT IN and an ALL clause.

8. The method as recited in claim 7, further comprising prompting a user to select preferences to be used during tuning based on whether the database query includes at least one of a NOT EXISTS, a NOT IN and an ALL clause.

9. The method of claim 1, wherein tuning automatically the selected database query comprises changing a join order of the selected database query or moving a subquery within the selected database query.

10. The method of claim 1, further comprising displaying a diagram of each subquery included in the selected database query.

11. The method of claim 1, further comprising displaying a primary key for each table referenced in the selected database query.

12. The method as recited in claim 8, wherein the preferences include rewrite preferences for enabling a user to select at least one of a conversion of NOT EXISTS operators to a NOT IN operator and conversion of the selected database query to an outer join.

13. The method as recited in claim 8, wherein the preferences include rewrite preferences for enabling a user to select to convert subqueries joined by an ALL operator to a join or outer-join.

14. The method as recited in claim 8, wherein the preferences include rewrite preferences for enabling a user to select whether to use at least one of a NOT EXISTS operator and an outer-join to convert subqueries joined by a NOT In operator.

15. A computer storage medium including computer executable code for tuning a database query, comprising:
   computer executable code for allowing a user to select a query of a database;
   computer executable code for parsing the selected database query to determine that the database query includes a first operator;
   computer executable code for selecting an optimization mode from a plurality of available optimization modes, wherein:
      a first optimization mode is automatically selected if one or more statistics exist for a table identified by the database query, and
      a second optimization mode is selected if one or more statistics do not exist for the table identified by the database query;
   computer executable code for automatically tuning the selected database query based on the structure of the database and the selected optimization mode; and
   computer executable code for displaying the tuned database query, and
   wherein the computer executable code for automatically tuning the selected database query comprises computer executable code for automatically rewriting the selected database query by converting the first operator to a second operator.

16. The computer storage medium as recited in claim 15, wherein the parsing determines tokens within the database query, tokens being words separated by delimiters.

17. The computer storage medium as recited in claim 15, wherein the plurality of available optimization modes include Cost based and Rule based modes.

18. The computer storage medium as recited in claim 17, wherein the Cost based modes include First_Rows mode and All_Rows mode.

19. The computer storage-medium as recited in claim 15, further comprising code for determining a cost associated with using the tuned database query.

20. The computer storage medium as recited in claim 19, further comprising code for comparing a cost associated with using the selected database query to the cost associated with using the tuned database query.

21. The computer storage medium as recited in claim 15, further comprising code for parsing the selected database query to determine whether the database query includes at least one subquery joined by at least one of a NOT EXISTS, a NOT IN and an ALL clause.

22. The computer storage medium as recited in claim 21, further comprising code for prompting a user to select preferences to be used during tuning based on whether the database query includes at least one of a NOT EXISTS, a NOT IN and an ALL clause.

23. The computer storage medium as recited in claim 22, wherein the preferences include rewrite preferences for enabling a user to select at least one of a conversion of NOT EXISTS operators to a NOT IN operator and conversion of the selected database query to an outer join.

24. The computer storage medium as recited in claim 22, wherein the preferences include rewrite preferences for enabling a user to select to convert subqueries joined by an ALL operator to a join or outer-join.

25. The computer storage medium as recited in claim 22, wherein the preferences include rewrite preferences for enabling a user to select whether to use at least one of a NOT EXISTS operator and an outer-join to convert subqueries joined by a NOT In operator.

26. A programmed computer system for tuning a database query, comprising:
   a display for displaying at least one of a plurality of database queries of a database to a user;
   a user input allowing the user to select a database query from among the displayed database queries; and
   a processor for parsing the selected database query to determine that the database query includes a first operator and for automatically tuning the selected database query based on the structure of the database, the tuned database query being displayed to the user via the display, wherein automatically tuning the selected database query comprises:
      automatically selecting a first optimization mode if one or more statistics exist for a table identified by the database query, and
      selecting a second optimization mode is selected if one or more statistics do not exist for the table identified by the database query, and
   wherein automatically tuning the selected database query comprises automatically rewriting the selected database query by converting the first operator to a second operator.

27. The system as recited in claim 26, wherein the parsing determines tokens within the database query, tokens being words separated by delimiters.

28. The system as recited in claim 26, wherein the plurality of available optimization modes include Cost based and Rule based modes.

29. The system as recited in claim 28, wherein the Cost based modes include First_Rows mode and All_Rows mode.

30. The system as recited in claim 26, wherein the processor determines a cost associated with using the tuned database query.

31. The system as recited in claim 30, wherein the processor compares a cost associated with using the selected database query to the cost associated with using the tuned database query.

32. The system as recited in claim 26, wherein the processor parses the selected database query to determine whether the database query includes at least one subquery joined by at least one of a NOT EXISTS, a NOT IN and an ALL clause.

33. The system as recited in claim 32, wherein the processor prompts the user to select preferences to be used during tuning based on whether the database query includes at least one of a NOT EXISTS, a NOT IN and an ALL clause.

34. The system as recited in claim 33, wherein the preferences include rewrite preferences for enabling a user to select at least one of a conversion of NOT EXISTS operators to a NOT IN operator and conversion of the selected database query to an outer join.

35. The system as recited in claim 33, wherein the preferences include rewrite preferences for enabling a user to select to convert subqueries joined by an ALL operator to a join or outer-join.

36. The system as recited in claim 33, wherein the preferences include rewrite preferences for enabling a user to select whether to use at least one of a NOT EXISTS operator and an outer-join to convert subqueries joined by a NOT In operator.

37. A method of tuning a database query, comprising:
allowing a user to select a query of a database;
parsing the selected database query to determine that the database query includes a first operator;
selecting an optimization mode from a plurality of available optimization modes;
tuning automatically the selected database query based on the structure of the database and the selected optimization mode; and
displaying the tuned database query,
wherein automatically tuning the selected database query comprises automatically rewriting the selected database query by converting the first operator to a second operator, and
wherein selecting the optimization mode from the plurality of available optimization modes comprises:
determining whether one or more statistics exist for a table identified by the query;
automatically selecting a first optimization mode if the one or more statistics exist for the table; and
automatically selecting a second optimization mode if the one or more statistics do not exist for the table.

38. A method of tuning a database query, comprising:
allowing a user to select a query of a database;
parsing the selected database query to determine that the database query includes a first operator;
selecting an optimization mode from a plurality of available optimization modes;
tuning automatically the selected database query based on the structure of the database and the selected optimization mode; and
displaying the tuned database query,
wherein automatically tuning the selected database query comprises automatically rewriting the selected database query by converting the first operator to a second operator, and
wherein selecting the optimization mode from the plurality of available optimization modes comprises:
determining whether one or more statistics exist for a table identified by the query;
automatically selecting a first optimization mode if the one or more statistics exist for the table; and
receiving user preferences for selecting a second optimization mode if the one or more statistics do not exist for the table.

* * * * *